(12) United States Patent
Zhang et al.

(10) Patent No.: US 12,047,583 B2
(45) Date of Patent: Jul. 23, 2024

(54) HYBRID INTER BI-PREDICTION IN VIDEO CODING

(71) Applicant: QUALCOMM Incorporated, San Diego, CA (US)

(72) Inventors: Zhi Zhang, Munich (DE); Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/808,510

(22) Filed: Jun. 23, 2022

(65) Prior Publication Data

US 2022/0417521 A1   Dec. 29, 2022

Related U.S. Application Data

(60) Provisional application No. 63/266,390, filed on Jan. 4, 2022, provisional application No. 63/283,004, filed
(Continued)

(51) Int. Cl.
*H04N 19/70* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/70* (2014.11)

(58) Field of Classification Search
CPC .. H04N 19/137; H04N 19/105; H04N 19/159; H04N 19/176; H04N 19/70
(Continued)

(56) References Cited

U.S. PATENT DOCUMENTS

2018/0359483 A1   12/2018   Chen et al.
2019/0007699 A1 *   1/2019   Liu ............... H04N 19/172
(Continued)

FOREIGN PATENT DOCUMENTS

WO   2020147747 A1   7/2020
WO   WO-2023278964 A1 *   1/2023   ........... H04N 19/105

OTHER PUBLICATIONS

Alshina E., et al., "EE1-2.1: Super Resolution with Existing VVC Functionality," JVET-Y0061-v2, Joint Video Experts Team (JVET) of ITU-T SG 16 WP 3 and ISO/IEC JTC 1/SC 29, 25th Meeting, by teleconference, Jan. 12-21, 2022, pp. 1-3.
(Continued)

*Primary Examiner* — Albert Kir
(74) *Attorney, Agent, or Firm* — Shumaker & Sieffert, P.A.

(57) ABSTRACT

A video decoder can be configured to determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

34 Claims, 17 Drawing Sheets

Related U.S. Application Data on Nov. 24, 2021, provisional application No. 63/235,071, filed on Aug. 19, 2021, provisional application No. 63/215,257, filed on Jun. 25, 2021.

(51) Int. Cl.
  *H04N 19/137* (2014.01)
  *H04N 19/159* (2014.01)
  *H04N 19/176* (2014.01)
  *H04N 19/513* (2014.01)

(58) Field of Classification Search
  USPC .................................................. 375/240.02
  See application file for complete search history.

(56) References Cited

U.S. PATENT DOCUMENTS

| | | | |
|---|---|---|---|
| 2021/0037238 A1* | 2/2021 | Park | H04N 19/105 |
| 2021/0314596 A1* | 10/2021 | Wang | H04N 19/105 |
| 2022/0167001 A1 | 5/2022 | Zhang | |
| 2022/0417522 A1* | 12/2022 | Huang | H04N 19/513 |
| 2023/0007238 A1* | 1/2023 | Chen | H04N 19/105 |
| 2023/0054289 A1* | 2/2023 | Li | H04N 19/159 |

OTHER PUBLICATIONS

Bross B., et al., "Versatile Video Coding Editorial Refinements on Draft 10," JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515, XP030293334.

Chen J., et al., "Algorithm Description for Versatile Video Coding and Test Model 11 (VTM 11)," JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description of Joint Exploration Test Model 7 (JEM7)," 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, Aug. 19, 2017, XP030150980, 48 Pages.

Chen Y., et al., "Description of SDR, HDR and 360° Video Coding Technology Proposal by Qualcomm and Technicolor—Low and High Complexity Versions," JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Coban M., et al., "Algorithm Description of Enhanced Compression Model 2 (ECM 2)," 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

Coban M., et al., "Algorithm Description of Enhanced Compression Model 3 (ECM 3)," JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Esenlik S., et al., "Description of Core Experiment 9 (CE9): Decoder Side Motion Vector Derivation," 10. JVET Meeting, Apr. 10, 2018-Apr. 20, 2018, San Diego, (The Joint Video Exploration Team of ISO/IEC JTC1/SC29/WG11 and ITU-T SG.16), No. JVET-J1029-v5, May 14, 2018, XP030151329, 34 Pages.

Huang H., et al., "EE2: Adaptive Decoder Side Motion Vector Refinement (Test 3.4)," JVET-X0049-v1, Joint Video Experts Team (JVET) of ITU-T SG 16 WP 3 and ISO/IEC JTC 1/SC 29, 24th Meeting, by teleconference, Oct. 6-15, 2021, pp. 1-3.

International Search Report and Written Opinion—PCT/US2022/034845—ISA/EPO—Oct. 10, 2022 12 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing," JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Karczewicz M., et al., "Common Test Conditions and Evaluation Procedures for Enhanced Compression Tool Testing," JVET-W2017-v1, Joint Video Experts Team (JVET) of ITU-T SG 16 WP 3 and ISO/IEC JTC 1/SC 29, 23rd Meeting, by teleconference, Jul. 7-16, 2021, pp. 1-7.

Luo J., et al., "JVET Functionality Confirmation Test Condition for reference Picture Resampling," JVET-Q2015-v2, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-2.

Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Zhang Z., et al., "EE2-Related: Bilateral Matching AMVP-Merge Mode," JVET-W0106-v3, Joint Video Experts Team (JVET) of ITU-T SG 16 WP 3 and ISO/IEC JTC 1/SC 29, 23rd Meeting, by teleconference, Jul. 7-16, 2021, pp. 1-2.

Zhang Z., et al., "EE2: Bilateral and Template Matching AMVP-Merge Mode (Test 3.3)," JVET-X0083-v1, Joint Video Experts Team (JVET) of ITU-T SG 16 WP 3 and ISO/IEC JTC 1/SC 29, 24th Meeting, by teleconference, Oct. 6-15, 2021, pp. 1-3.

Zhang Z., et al., "Non-EE2: Fixing Issues for RPR Enabling and Non-CTC Configuration in ECM," JVET-Y0128-v4, Joint Video Experts Team (JVET) of ITU-T SG 16 WP 3 and ISO/IEC JTC 1/SC 29, 25th Meeting, by teleconference, Jan. 12-21, 2022, pp. 1-5.

Zhang Z., et al., "Non-EE2: MVD and Merge Index Signaling of AMVP-Merge Mode," JVET-Y0129-v1, Joint Video Experts Team (JVET) of ITU-T SG 16 WP 3 and ISO/IEC JTC 1/SC 29, 25th Meeting, by teleconference, Jan. 12-21, 2022, pp. 1-2.

* cited by examiner

HYBRID INTER BI-PREDICTION IN VIDEO CODING

This application claims the benefit of:

U.S. Provisional Patent Application No. 63/266,390, filed 4 Jan. 2022;

U.S. Provisional Patent Application No. 63/283,004, filed 24 Nov. 2021;

U.S. Provisional Patent Application No. 63/235,071, filed 19 Aug. 2021;

U.S. Provisional Patent Application No. 63/215,257, filed 25 Jun. 2021, the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

According to techniques of this disclosure, for a block predicted using bi-prediction, one of the two motion vectors for bi-prediction may be determined using explicit signaling, while the other of the two motion vectors may be predicted without explicit signaling by using decoder side motion derivation techniques. The technique of using one explicitly signaled motion vector and one motion vector derived without signaling may be referred to herein as a hybrid inter bi-prediction, or more simply as hybrid-bi mode.

With hybrid-bi mode, a first motion vector may be derived from a first candidate list, with the video decoder receiving, in the bitstream, an index identifying a candidate. With the hybrid-bi mode, the video decoder may determine the second motion vector from a second candidate list, but instead of receiving in the bitstream syntax explicitly identifying the selected candidate, the video decoder may determine the candidate for the second motion vector based on a minimum bilateral matching error between a first reference block identified by the first motion vector and a second reference block. For each candidate in the second candidate list, the video decoder may locate a second reference block and determine a bilateral matching error between the second reference block and the first reference block. The video decoder may select as the second motion vector, the motion vector from the second candidate list that points to the second reference block that produces the minimum, or lowest, bilateral matching error with respect to the first reference block. In some instances, the video decoder may further refine the selected motion vector using various decoder-side motion vector derivation techniques.

By determining a first motion vector for a current block based on a motion vector predictor and a motion vector difference that are explicitly signaled and determining a second motion vector for the current block from a second list of candidate motion vector predictors based on bilateral matching without explicit signaling, the techniques of this disclosure may advantageously produce an improved rate-distortion tradeoff for bi-predicted blocks. For example, the techniques of this disclosure may reduce the signaling overhead associated with bi-prediction, while still maintaining high prediction quality.

According to one example of this disclosure, a method of decoding video data includes determining that a current block of the video data is coded in a bi-prediction inter mode; receiving a first syntax element identifying a motion vector predictor from a first candidate list of motion vector predictors; receiving a second syntax element identifying a motion vector difference; determining a first motion vector for the current block based on the motion vector predictor and the motion vector difference; determining a second motion vector for the current block from a second list of candidate motion vector predictors based on bilateral matching; and determining a prediction block for the current block using the first motion vector and the second motion vector.

According to another example of this disclosure, a device for decoding video data includes a memory configured to store video data and one or more processors implemented in circuitry and configured to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

According to another example of this disclosure, a device for encoding video data includes a memory configured to store video data and one or more processors implemented in circuitry and configured to: determine that a current block of the video data is coded in a bi-prediction inter mode;

determine a first motion vector for the current block; generate, for inclusion in a bitstream of encoded video data, a first syntax element identifying a motion vector predictor from a first candidate list of motion vector predictors; generate, for inclusion in the bitstream of encoded video data, a second syntax element identifying a motion vector difference, wherein the motion vector predictor and the motion vector difference correspond to the first motion vector; determine a second motion vector for the current block from a second list of candidate motion vector predictors based on bilateral matching; determine a prediction block for the current block using the first motion vector and the second motion vector; and encode the current block of video data based on the prediction block.

According to another example of this disclosure, a computer-readable storage medium stores instructions that when executed by one or more processors cause the one or more processors to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

According to another example of this disclosure, a device for decoding video data includes means for determining that a current block of the video data is coded in a bi-prediction inter mode; means for receiving a first syntax element identifying a motion vector predictor from a first candidate list of motion vector predictors; means for receiving a second syntax element identifying a motion vector difference; means for determining a first motion vector for the current block based on the motion vector predictor and the motion vector difference; means for determining a second motion vector for the current block from a second list of candidate motion vector predictors based on bilateral matching; and means for determining a prediction block for the current block using the first motion vector and the second motion vector.

According to another example of this disclosure, a device for encoding video data includes means for determining that a current block of the video data is coded in a bi-prediction inter mode; means for determining a first motion vector for the current block; means for generating, for inclusion in a bitstream of encoded video data, a first syntax element identifying a motion vector predictor from a first candidate list of motion vector predictors; means for generating, for inclusion in the bitstream of encoded video data, a second syntax element identifying a motion vector difference, wherein the motion vector predictor and the motion vector difference correspond to the first motion vector; means for determining a second motion vector for the current block from a second list of candidate motion vector predictors based on bilateral matching; means for determining a prediction block for the current block using the first motion vector and the second motion vector; and means for encoding the current block of video data based on the prediction block.

The details of one or more examples are set forth in the accompanying drawings and the description below. Other features, objects, and advantages will be apparent from the description, drawings, and claims.

DETAILED DESCRIPTION

Figure 1:
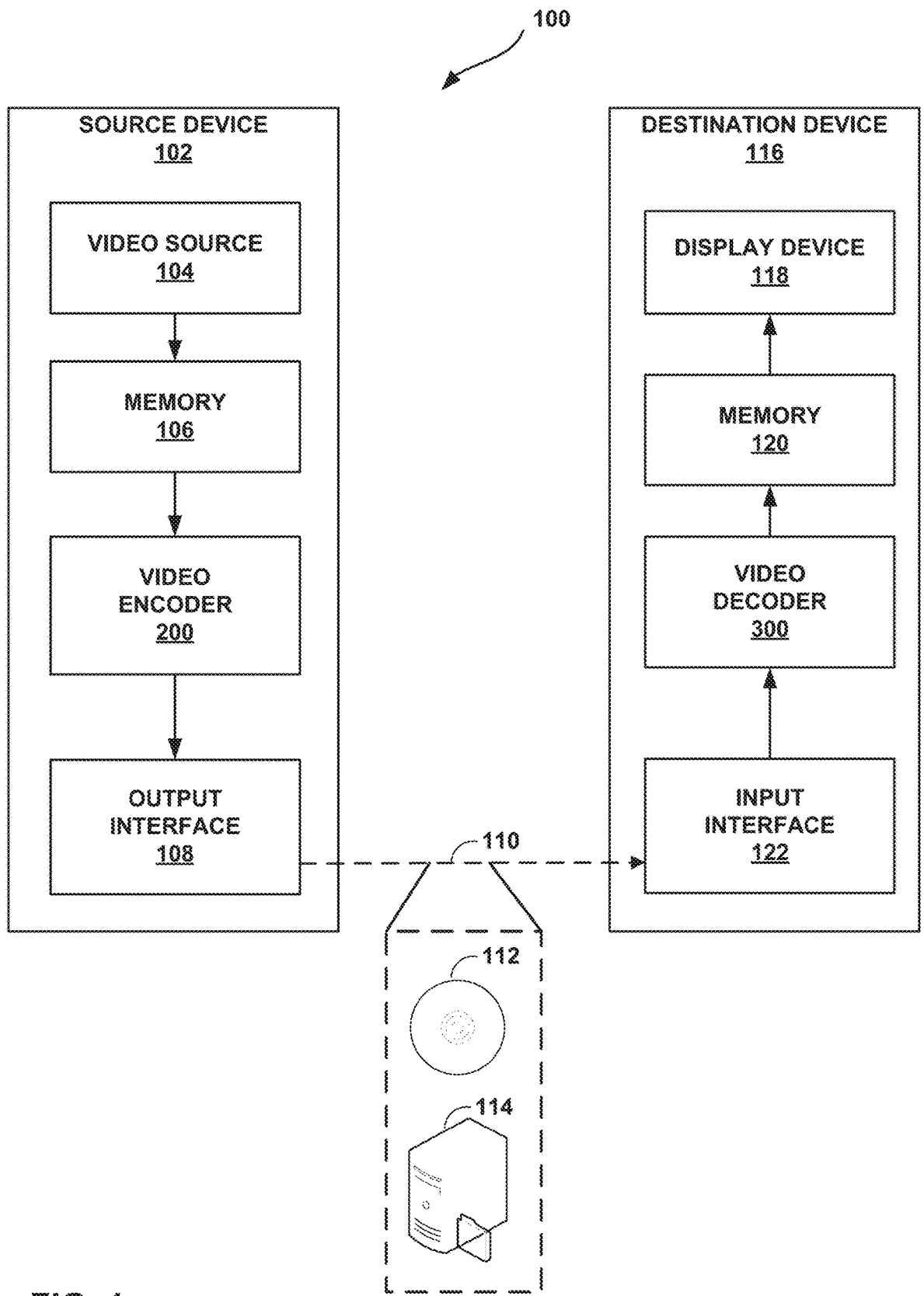
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

A video coder may predict a block using uni-directional prediction or bi-directional prediction, also referred to simply as bi-prediction. For uni-directional prediction a final prediction block is determined based on a prediction block identified by a single motion vector, whereas in bi-prediction a final prediction block is determined based on two prediction blocks identified by two motion vectors. This disclosure describes techniques related to inter bi-prediction that utilize decoder-side motion vector derivation techniques (e.g., template matching, bilateral matching, decoder-side motion vector refinement).

As will be described in more detail below, when coding a block of video data using inter prediction, a video encoder and video decoder may be configured to code the block in various modes, such as merge mode and advanced motion vector predictor (AMVP) mode. In both merge mode and AMVP mode, a video encoder and video decoder are configured to generate a list of candidate motion vectors (e.g., a candidate list of motion vector predictors). For merge mode, each merge candidate in the list includes motion information for predicting a block. The motion information may, for example, include one or more motion vectors and one or more reference picture identifies. For AMVP mode, each AMVP candidate may only include a motion vector that is to be used as a motion vector predictor (MVP). A motion vector difference (MVD) representing a difference between the MVP and the actual motion vector may also be signaled.

AMVP has a high signaling overhead but generally produces good prediction. Merge mode has a relatively lower signaling overhead but, on average, does not produce as good of quality of prediction as AMVP. The techniques described herein may produce a better rate-distortion tradeoff when compared to existing techniques for implementing bi-prediction by enabling video encoders and video decoders to identify better motion vectors without undesirable increases to signaling overhead.

According to techniques of this disclosure, for a block predicted using bi-prediction, one of the two motion vectors for bi-prediction may be determined using explicit signaling, while the other of the two motion vectors may be predicted without explicit signaling by using decoder side motion derivation techniques. The technique of using one explicitly signaled motion vector and one motion vector derived without signaling may be referred to herein as a hybrid inter bi-prediction, or hybrid-bi mode.

With hybrid-bi mode, a first motion vector may be derived using either AMVP or merge mode, with the video decoder receiving, in the bitstream, an index identifying a candidate in a merge candidate list or an AMVP candidate list. With the hybrid-bi mode, the video decoder may determine the second motion vector from a second candidate list, but instead of receiving in the bitstream syntax explicitly identifying the selected candidate, the video decoder may determine the candidate for the second motion vector based on a minimum bilateral matching error between a first reference block identified by the first motion vector and a second reference block. For each candidate in the second candidate list, the video decoder may locate a second reference block and determine a bilateral matching error between the second reference block and the first reference block. The video decoder may select as the second motion vector, the motion vector from the second candidate list that points to the second reference block that produces the minimum, or lowest, bilateral matching error with respect to the first reference block. In some instances, the video decoder may further refine the selected motion vector using various decoder-side motion vector derivation techniques.

In this context, the bilateral matching error, also referred to as a bilateral matching cost, represents a difference between two reference blocks in reference pictures that are on opposite sides of a current picture of a current block. Two reference blocks that are relatively more similar typically have a lower bilateral matching error compared to two reference blocks that are more different. The similarity or difference of two reference blocks may be determined by various techniques described herein based on sample values of the two reference blocks.

By determining a first motion vector for a current block based on an MVP and an MVD that are explicitly signaled and determining a second motion vector for the current block from a second list of candidate MVPs based on bilateral matching without explicit signaling, the techniques of this disclosure may advantageously produce an improved rate-distortion tradeoff for bi-predicted blocks. For example, the techniques of this disclosure may reduce the signaling overhead associated with bi-prediction, while still maintaining high prediction quality.

As will be explained in more detail below, the techniques described herein may produce a better rate-distortion tradeoff when compared to existing techniques for implementing bi-prediction by enabling video encoders and video decoders to identify better motion vectors without undesirable increases to signaling overhead. The techniques described herein may be applied to any of the existing video codecs, such as HEVC (High Efficiency Video Coding), VVC (Versatile Video Coding), Essential Video Coding (EVC) or be an efficient coding tool in future video coding standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for hybrid inter bi-prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for hybrid inter bi-prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use inter bi-prediction.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "NxN" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. In this context, a motion vector generally refers to any information that identifies the location of a reference block in a reference picture. A motion vector may, for example, be represented as an offset between the location of a top-left sample of a current block in a current picture and a top-left sample of a reference block in a reference picture. As explained elsewhere in this disclosure, in some coding scenarios, video encoder 200 may signal an initial motion vector that identifies the location of an initial reference block. Video decoder 300 may subsequently refine the motion vector by locating a refined reference block that is different than, but typically close in proximity to, the initial reference block.

Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using AMVP or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header (PH), a block header, a slice header (SH), or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In VVC, the largest coding unit in a slice is called a coding tree block (CTB) or coding tree unit (CTU). A CTB contains a quad-tree, binary-tree or ternary-tree, the nodes of which are coding units. The size of a CTB can range from 4×4 to 128×128 in the VVC main profile. A coding unit (CU) could be the same size of a CTB or as small as 4×4. Each coding unit is coded with one mode, e.g., inter or intra. An intercoded CU (e.g., current block coded in inter mode) may be further partitioned into 2, 3 or 4 prediction units (PUs) or become one PU when further partitioning does not apply. When two PUs are present in one CU, the two PUs are evenly divided to be half-size rectangles. When three PUs are present in one CU, three rectangles of ¼, ½ and ¼ size of the CU. When the CU is inter-coded, each PU has one set of motion information, which is derived with a unique inter prediction mode.

Video encoder 200 and video decoder 300 may be configured to perform motion vector prediction. In the VVC standard, there are two inter prediction modes, named merge mode (skip mode being considered as a special case of merge mode) and AMVP mode, respectively, for a prediction unit (PU).

In AMVP mode, a motion vector candidate list (e.g., candidate list of motion vector predictors) is maintained for multiple MVPs. The motion vector(s), as well as reference indices in AMVP mode, of the current PU are generated by taking one candidate from the motion vector candidate list. For inter mode prediction, video encoder 200 and video decoder 300 may also generate two lists of reference pictures, referred to as list 0 and list 1, from which one or more blocks are selected for inter prediction. The motion vector candidate list contains up to two candidates for the AMVP mode. In AMVP mode, for each potential prediction direction, a reference index is signaled, together with an MVP index to the motion vector candidate list (e.g., candidate list of motion vector predictors) since the AMVP candidate contains only a motion vector. In AMVP mode, the predicted motion vectors can be further refined. The candidates for AMVP modes are derived from spatial, temporal neighboring blocks or history-based motion information table.

Figure 2B:
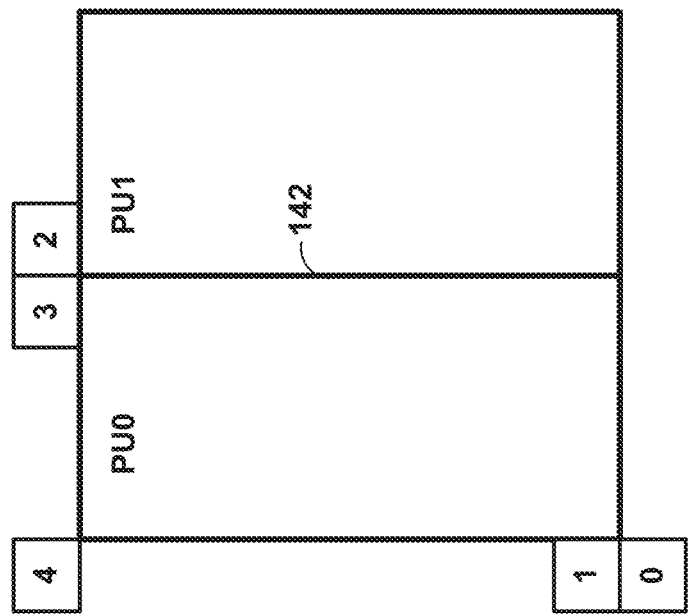
FIG. 2B shows examples of spatial neighboring motion vector candidates for AMVP mode.
Figure 2A:
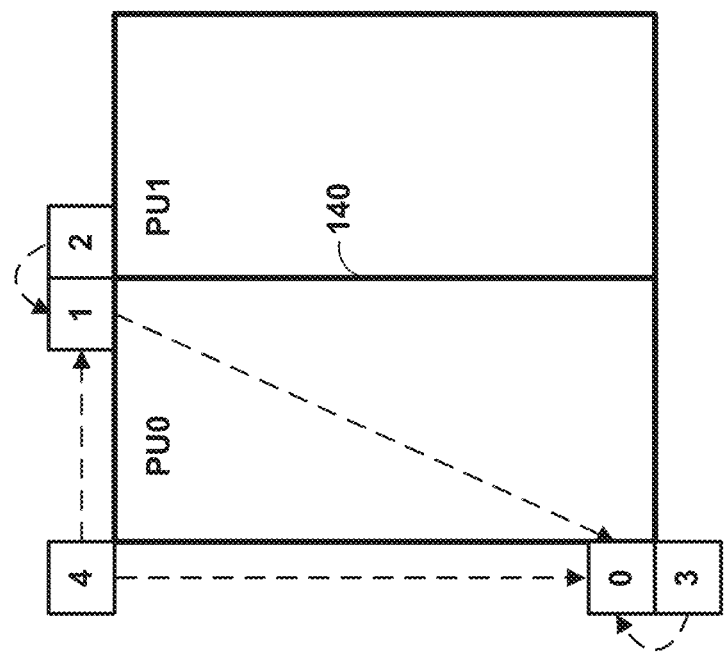
FIG. 2A shows examples of spatial neighboring motion vector candidates for merge mode.

FIG. 2A is a conceptual diagram showing an example of spatial neighboring motion vector candidates for merge mode. Video decoder 300 may generate a candidate list by adding the motion information of spatial neighboring candidates to the candidate list. Spatial motion vector candidates are derived from the neighboring blocks shown in FIGS. 2A and 2B, for a specific PU (PU0), although the processes for generating the candidates from the blocks may differ for merge and AMVP modes. In merge mode, up to five spatial motion vector candidates can be derived for block 140 (PU0) with the orders shown in FIG. 2A. Video encoder 200 and video decoder 300 may be configured to use the following order: left (0), above (1), above right (2), below left (3), and above left (4), as shown in FIG. 2A.

FIG. 2B is a conceptual diagram showing an example of spatial neighboring motion vector candidates for AMVP. In AMVP mode, the neighboring blocks of block 142 (PU0) are divided into two groups: a left group including block 0 and 1, and an above group including blocks 2, 3, and 4, as shown in FIG. 2B. For each group, the potential candidate in a neighboring block referring to the same reference picture as that indicated by the signaled reference is prioritized to form a final candidate of the group. It is possible that all neighboring blocks do not contain a motion vector pointing to the same reference picture. Therefore, if such a candidate cannot be found, the first available candidate may be scaled to form the final candidate, allowing the temporal distance differences to be compensated.

The following describes temporal motion vector prediction. Video encoder 200 and video decoder 300 may be configured to add a temporal motion vector predictor (TMVP) candidate, if enabled and available, into the motion vector candidate list after spatial motion vector candidates are added. The process of motion vector derivation for a TMVP candidate may be the same for both merge and AMVP modes. However, in some examples, the target reference index for the TMVP candidate in the merge mode may be set to 0.

Figure 3B:
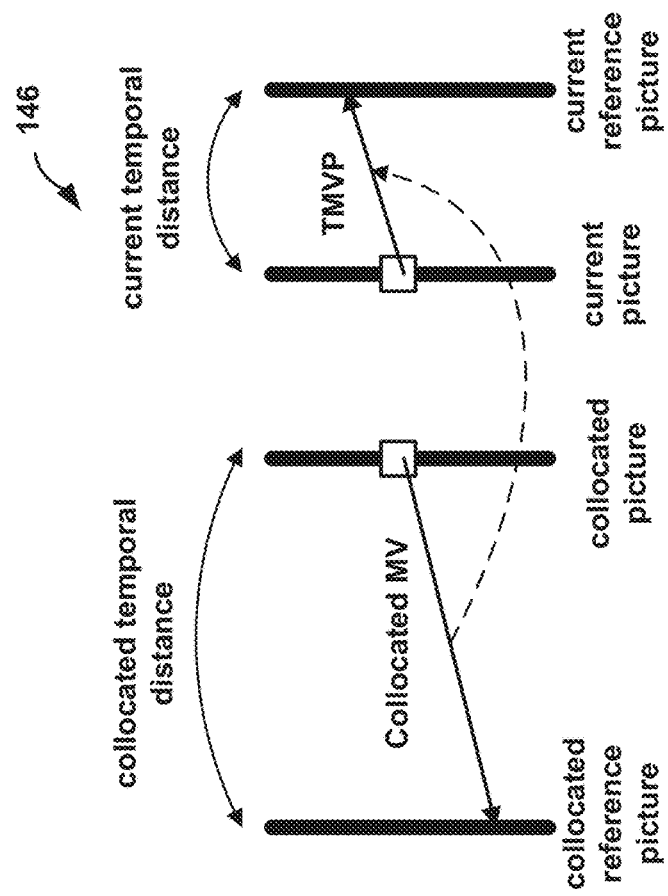
FIG. 3B illustrates an example of motion vector scaling.
Figure 3A:
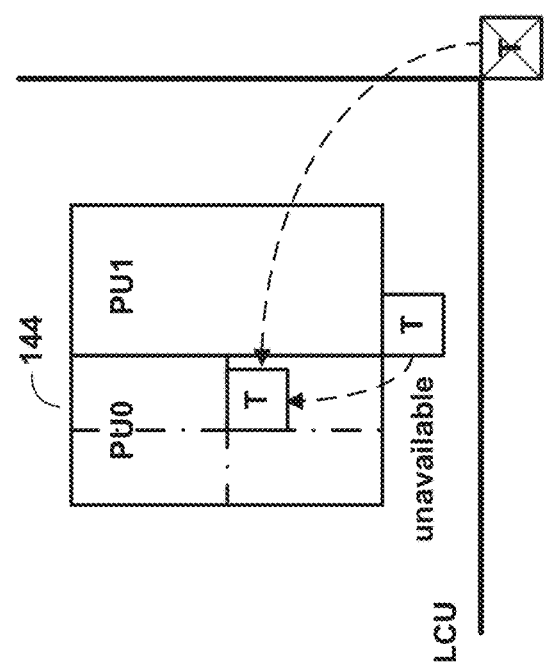
FIG. 3A shows an example of a temporal motion vector predictor candidate.

FIG. 3A is a conceptual diagram showing an example of a TMVP candidate for block 144 (PU0). The primary block location for TMVP candidate derivation is the bottom right block outside of the collocated PU, which is shown as block "T" in FIG. 3A, to compensate the bias to the above and left blocks used to generate spatial neighboring candidates. However, if that block is located outside of the current CTB row or motion information is not available, the block is substituted with a center block of the PU.

Video decoder 300 may derive a motion vector for the TMVP candidate from the co-located PU of the co-located picture, indicated at a slice level. The motion vector for the co-located PU is called the collocated MV. A block in a reference picture may, for example, be considered to be co-located to a block in a current picture if the block in the reference picture and the current block each include at least one pixel corresponding to a same relative position in the reference picture and the current picture.

FIG. 3B is a conceptual timing diagram showing an example of motion vector scaling process 146. Similar to temporal direct mode in AVC, to derive the TMVP candidate motion vector, video decoder 300 may scale the co-located motion vector to compensate for the temporal distance differences, as shown in FIG. 3B. With motion vector scaling, it is generally assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector being predicted, the associated containing picture and reference picture may be different. Therefore, a new distance based on POC may be calculated, and the motion vector may be scaled based on the two POC distances. For a spatial neighboring candidate, the containing picture for the two motion vectors are the same, while the reference pictures are different. In HEVC, motion vector scaling applies to both TMVP and AMVP for spatial and temporal neighboring candidates.

Video encoder 200 and video decoder 300 may be configured to perform artificial motion vector candidate generation. If a motion vector candidate list is not complete (e.g., less than some predetermined number of candidates), artificial motion vector candidates are generated and inserted at the end of the list until the list has the designated number of candidates.

In merge mode, there are two types of artificial motion vector candidates: combined candidate derived only for B-slices and zero motion vector candidates used for AMVP if the combined candidate derived only for B-slices does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may be configured to perform a pruning process for candidate insertion. Motion vector candidates from different blocks may happen to be the same, which decreases the efficiency of a merge/AMVP candidate list. That is, two different motion vector candidates may point to two different blocks, but the values of the two different motion vector candidates may be same resulting in redundant candidates. A pruning process is applied to remove redundant candidates. The pruning process compares one candidate against the others in the current candidate list to avoid inserting identical candidate in some examples. To reduce the complexity, only limited numbers of pruning processes are applied instead of comparing each potential candidate with all the other existing candidates.

Video encoder 200 and video decoder 300 may be configured to perform bilateral matching prediction. Bilateral Matching (a.k.a. Bilateral Merge) (BM) prediction is a merge mode based on Frame-Rate Up Conversion (FRUC) techniques. When video encoder 200 and video decoder 300 apply the BM mode to a block, two initial motion vectors MV0 and MV1 are derived by using a signaled merge candidate index to select the merge candidate in a constructed merge list. Video encoder 200 and video decoder 300 then perform a bilateral matching search around the initial blocks located by MV0 and MV1. The final MV0' and MV1' are derived based on a minimum bilateral matching error.

Figure 4:
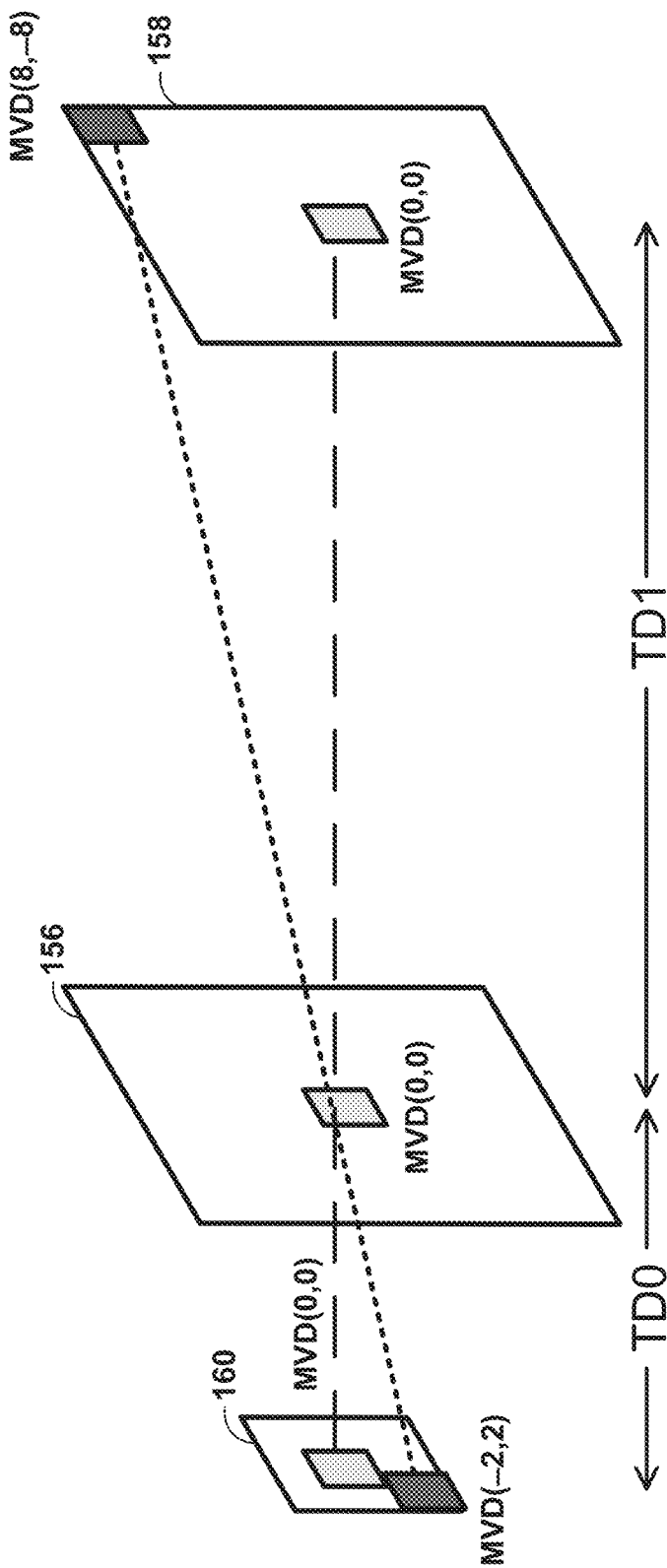
FIG. 4 shows an example of motion vectors that are proportional based on temporal distance.

MVD0 (denoted by MV0'-MV0) and MVD1 (denoted by MV1'-MV1) pointing to the two reference blocks are proportional to the temporal distances (TD), e.g., TD0 and TD1, between the current picture and the two reference pictures. FIG. 4 shows an example of MVD0 and MVD1, with TD1 being four times TD0.

Figure 5:
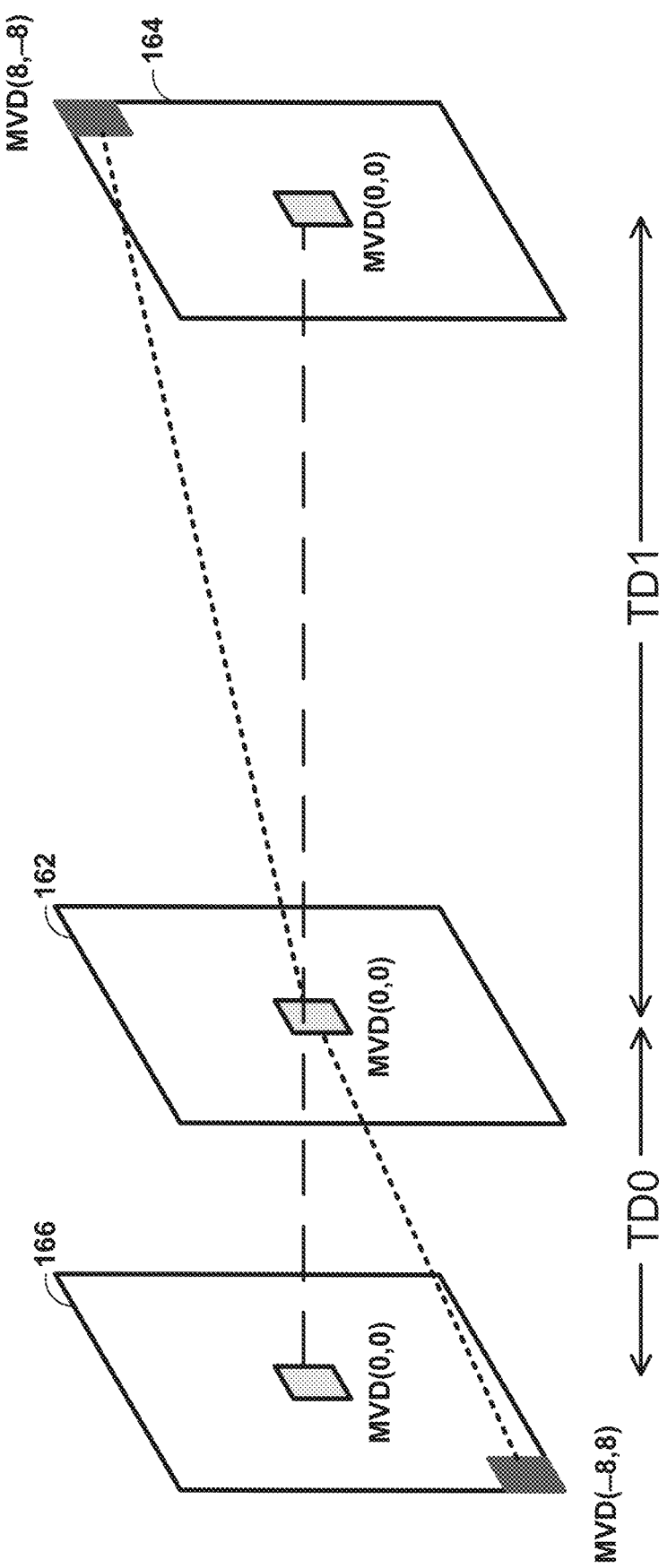
FIG. 5 shows an example of motion vectors that are mirrored regardless of temporal distance.

However, there is an optional design that MVD0 and MVD1 are mirrored regardless of the temporal distances TD0 and TD1. FIG. 5 shows an example of mirrored MVD0 and MVD1, with TD1 being four times of TD0.

Figure 6:
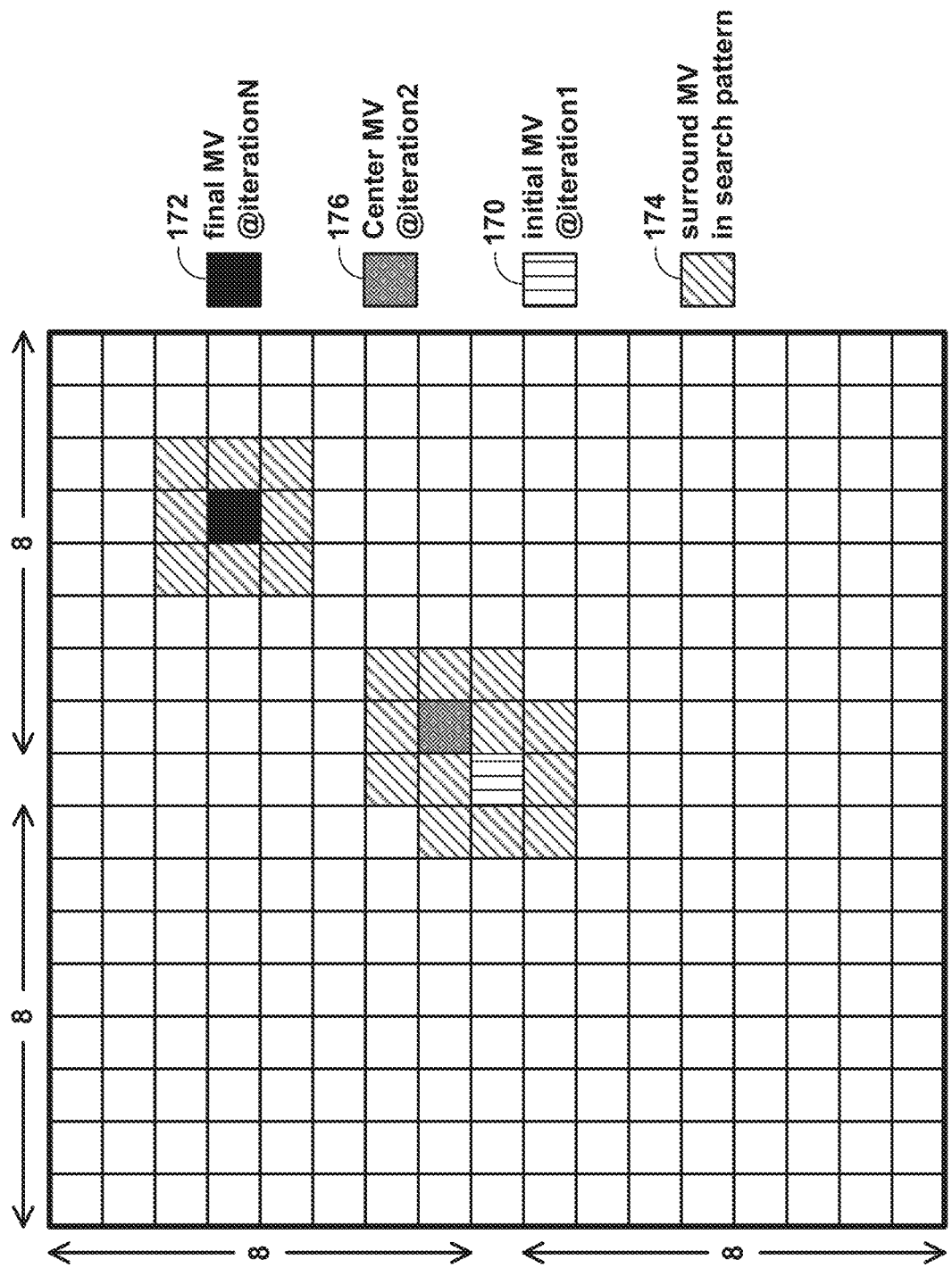
FIG. 6 shows an example of a 3×3 square search pattern with a search range [−8, 8].

Bilateral Matching performs a local search around the initial MV0 and MV1 to derive the final MV0' and MV1'. The local search applies a 3×3 square search pattern to loop through the search range [−8, 8]. In each search iteration, the bilateral matching error of the eight surrounding motion vectors in the search pattern are calculated and compared to the bilateral matching error of center MV. The motion vector which has minimum bilateral matching error becomes the new center motion vector in the next search iteration. The local search is terminated when the current center motion vector has a minimum cost within the 3×3 square search pattern or the local search reaches the pre-defined maximum search iteration. FIG. 6 shows an example of the 3×3 square search pattern in the search range [−8, 8].

Video encoder 200 and video decoder 300 may be configured to perform template matching (TM) prediction. TM prediction is a special merge mode based on FRUC techniques. In TM prediction mode, motion information for a block is not signaled but derived at decoder side. TM prediction may be applied to both AMVP mode and regular merge mode. In AMVP mode, MVP candidate selection is determined based on template matching techniques identifying a candidate that results in the minimal difference between a current block template and a reference block template. In regular merge mode, a TM mode flag may be signaled to indicate the use of TM, and then TM may be applied to the merge candidate indicated by merge index for motion vector refinement.

Figure 7:
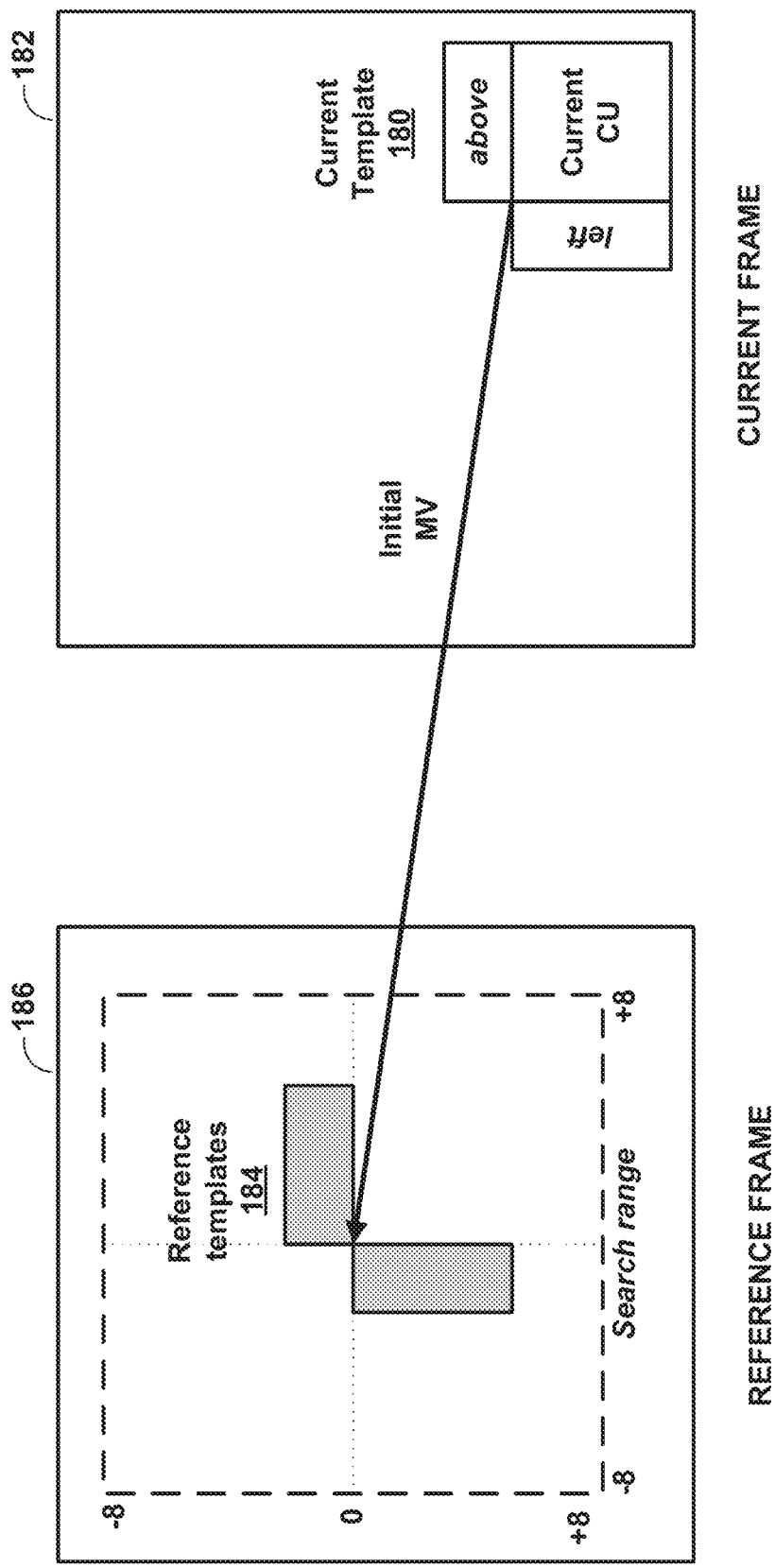
FIG. 7 shows an example of template matching performed on a search area around an initial motion vector.

FIG. 7 shows an example template matching process being performed on a search area around an initial MV. As shown in FIG. 7, video encoder 200 and video decoder 300 may be configured to use template matching to derive motion information of the current CU by finding the closest match between current template 180 (top and/or left neighboring blocks of the current CU) in current picture 182 and a template within reference templates 184 for a reference block (same size to the template) in reference picture 186. With an AMVP candidate selected based on initial matching error, video encoder 200 and video decoder 300 may refine the MVP with template matching. With a merge candidate indicated by a signaled merge index, the merged motion vectors corresponding to L0 and L1 may be refined independently by template matching. The less accurate of the merged motion vector may then be further refined based on the more accurate merged MV.

Video encoder 200 and video decoder 300 may be configured to implement a cost function. When a motion vector points to a fractional sample position, motion compensated interpolation is needed. To reduce complexity, bi-linear interpolation instead of regular 8-tap DCT-IF interpolation may be used for template matching to generate templates in reference pictures. An example matching cost C for template matching may be calculated as follows:

$$C = SAD + w \cdot (|MV_x - MV_x^s| + |MV_y - MV_y^s|)$$

where w is a weighting factor which is empirically set to 4, MV and MVS indicate the currently testing motion vector and the initial motion vector (e.g., an MVP candidate in AMVP mode or a merged motion vector in merge mode), respectively. A sum of absolute differences (SAD) may be used as the matching cost of template matching.

When TM is used, video encoder 200 and video decoder 300 may be configured to refine the motion vector (e.g., the initial MV) using only luma samples. The motion vector determined based on the refinement, however, may be used for both luma and chroma for MC (motion compensation) inter prediction. After a motion vector is determined, final MC may be performed using an 8-tap interpolation filter for luma and a 4-tap interpolation filter for chroma.

Video encoder 200 and video decoder 300 may be configured to implement a search process. Motion vector refinement may include a pattern-based motion vector search process with the criterion of template matching cost and utilizing a hierarchical structure. Two search patterns are supported—a diamond search and a cross search for motion vector refinement. The hierarchical structure specifies an iterative process to refine a MV, starting at a coarse MVD precision (e.g., quarter-pel) and ending at a finer precision (e.g., 1/8-pel). For example, a quarter-pel motion vector precision implies that a template matching process is performed on a search area around an initial motion vector to identify a refined motion vector where a step size of the search uses a quarter of a luma-sample distance (or resolution) as the MVD precision (between the initial motion vector and the refined MV). The motion vector is directly searched at a quarter luma sample MVD precision with a diamond pattern, followed by quarter luma sample MVD precision with a cross pattern, and then followed by one-eighth luma sample MVD refinement with cross pattern. The search range of motion vector refinement is set equal to (−8, +8) luma samples around the initial MV. When the current block is of bi-prediction, both motion vectors are refined independently, and then the best of which (in terms of matching cost) is set as a prior to further refine the other motion vector with BCW weight values.

Video encoder 200 and video decoder 300 may be configured to perform decoder-side motion vector refinement (DMVR). In VVC, DMVR may be applied to increase the accuracy of the motion vectors of the merge mode. In bi-prediction operation, a refined motion vector is searched around the initial motion vectors in the reference picture list L0 and reference picture list L1. The DMVR process calculates the distortion between the two candidate blocks in the reference picture list L0 and list L1.

Figure 8:
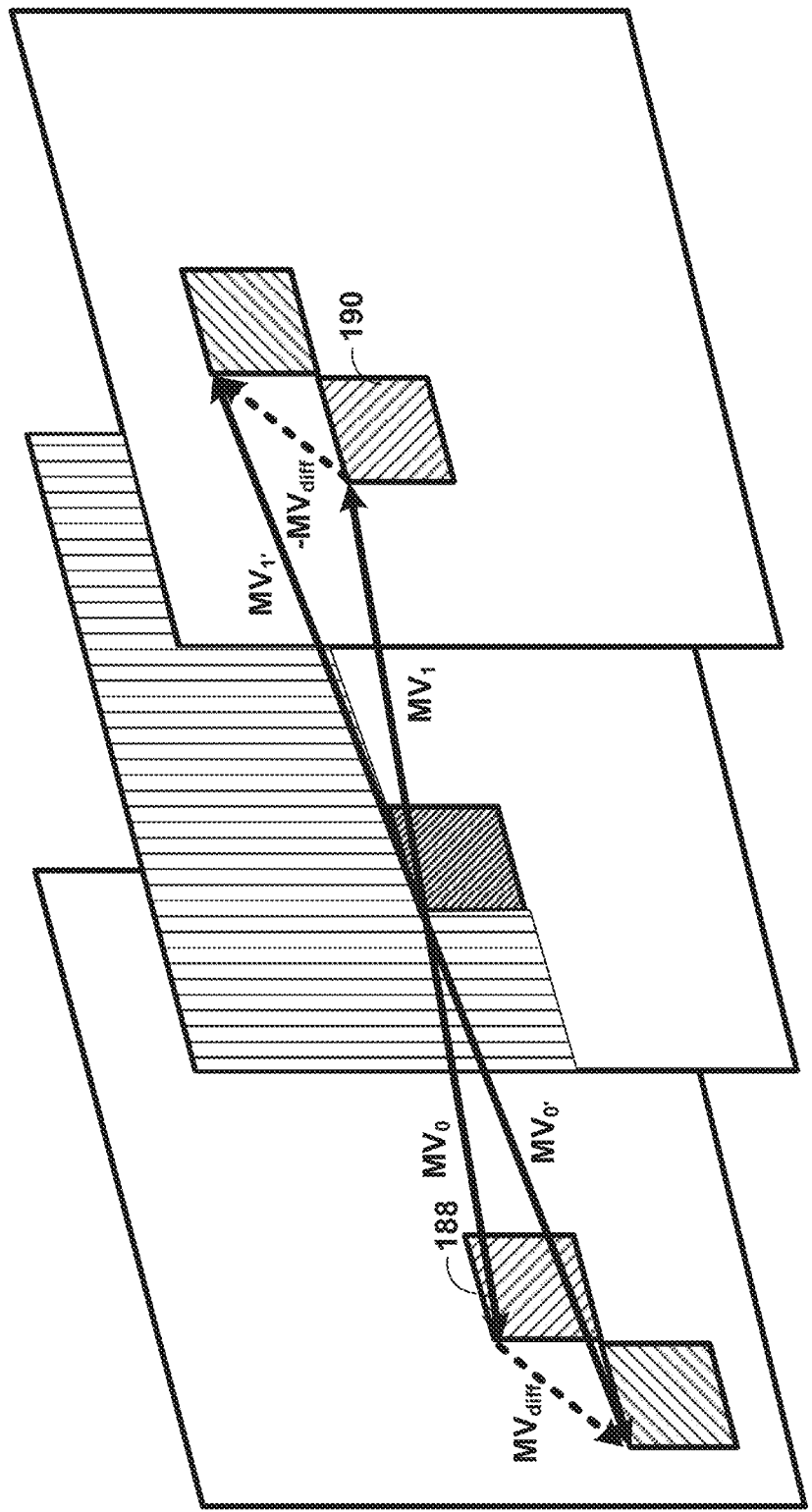
FIG. 8 shows an example of decoding side motion vector refinement.

FIG. 8 shows an example of decoder-side motion vector refinement. As illustrated in FIG. 8, video encoder 200 and video decoder 300 may be configured to calculate the SAD between block 188 and block 190 based on each motion vector candidate around the initial MV Block 188 may be from a reference picture in reference picture list L0, and block 190 may be from a reference picture in reference picture list L1. The motion vector candidate with the lowest SAD becomes the refined motion vector and used to generate the bi-predicted signal. In the example of FIG. 8, MV0 and MVi represent the initial motion vectors, and $MV_0'$ and $MV_1'$ represent the refined motion vectors, which have been refined by $MV_{diff}$ and $-MV_{diff}$, respectively.

The refined motion vector derived by the DMVR process is used to generate the inter prediction samples and also used in temporal motion vector prediction for future picture coding. While the original motion vector is used in deblocking processes and also used in spatial motion vector prediction for future CU coding. DMVR is a subblock-based merge mode with a pre-defined maximum processing unit of 16×16 luma samples. When the width and/or height of a CU are larger than 16 luma samples, the CU may be further split into subblocks with width and/or height equal to 16 luma samples.

Video encoder 200 and video decoder 300 may be configured to implement a searching scheme. In DVMR, the search points surround the initial motion vector, and the motion vector offsets are restricted by the MVD mirroring rule. In other words, any points that are checked by DMVR, denoted by candidate motion vector pair (MV0, MV1) obey the following two equations:

$$MV0' = MV0 + MV\_offset$$

$$MV1' = MV1 - MV\_offset$$

Where MV_offset represents the refinement offset between the initial motion vector and the refined motion vector in one of the reference pictures. In DMVR, the refinement search range is two integer luma samples from the initial MV. The searching includes the integer sample offset search stage and fractional sample refinement stage.

Video encoder 200 and video decoder 300 may be configured to apply a 25-point full search for integer sample offset searching. The SAD of the initial motion vector pair is first calculated. If the SAD of the initial motion vector pair is smaller than a threshold, the integer sample offset search stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, the original motion vector may be selected to be used during the DMVR process. The SAD between the reference blocks referred by the initial motion vector candidates is decreased by ¼ of the SAD value.

Following the integer sample search, video encoder 200 and video decoder 300 may be configured to perform fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y) = A(x - x_{min})^2 + B(y - y_{min})^2 + C$$

where $(x_{min}, y_{min})$ corresponds to the fractional position with the least cost and C corresponds to the minimum cost value.

By solving the above equations by using the cost value of the five search points, the ($x_{min}$, $y_{min}$) is computed as:

$$x_{min}=(E(-1,0)-E(1,0))/(2(E(-1,0)+E(1,0)-2E(0,0)))$$

$$y_{min}=(E(0,-1)-E(0,1))/(2(E(0,-1)+E(0,1)-2E(0,0)))$$

The value of $x_{min}$ and $y_{min}$ are automatically constrained to be between −8 and 8 since all cost values are positive and the smallest value is E(0,0). This corresponds to a half-pel offset with 1/16th-pel motion vector precision in VVC. The computed fractional ($x_{min}$, $y_{min}$) are added to the integer distance refinement motion vector to get the sub-pixel accurate refinement delta MV.

Video encoder 200 and video decoder 300 may be configured to perform bilinear-interpolation and sample padding. In VVC, the maximum resolution of the motion vectors is 1/16 luma samples. The samples at the fractional position are interpolated using an 8-tap interpolation filter. In DMVR, the search points surround the initial fractional-pel motion vector with integer sample offset. Therefore, the samples of those fractional position need to be interpolated for DMVR search process. To reduce the calculation complexity, the bi-linear interpolation filter is used to generate the fractional samples for the searching process in DMVR. In some examples, by using bi-linear filter with 2-sample search range, the DVMR does not access more reference samples compared to the normal motion compensation process. After the refined motion vector is attained with DMVR search process, the normal 8-tap interpolation filter is applied to generate the final prediction. In order to not access more reference samples than the normal MC process, video encoder 200 and video decoder 300 may be configured to pad samples that are not needed for the interpolation process based on the original motion vector but are needed for the interpolation process based on the refined MV.

Video encoder 200 and video decoder 300 may be configured to implement one or more enabling conditions for DMVR. In one example, video encoder 200 and video decoder 300 may be configured to enable DMVR if the following conditions are all satisfied, e.g., present or true.

CU level merge mode with bi-prediction MV
One reference picture is in the past and another reference picture is in the future with respect to the current picture
The distances (e.g., POC difference) from both reference pictures to the current picture are same
CU has more than 64 luma samples
Both CU height and CU width are larger than or equal to 8 luma samples
BCW weight index indicates equal weight
WP is not enabled for the current block
Combined intra and inter prediction (CIIP) mode is not used for the current block Existing techniques may exhibit some potential problems. When an AMVP mode coded block is predicted with inter bi-prediction, the final motion vector for each prediction direction (e.g., reference lists 0 and 1) is derived by applying an MVD to a corresponding MVP, with the MVP being derived using a signaled index to select a candidate from an AMVP candidate list and the MVD being derived by motion estimation and signaled in the bitstream. The signaled MVD increases the accuracy of the final motion vector and the quality of the predictor at the cost of compression efficiency.

When a merge mode coded block uses inter bi-prediction, the final motion vector for each prediction direction is derived from an MVP or a refined MVP, with the MVP being signaled using an index to select a candidate from a merge candidate list and the refined MVP being derived using bilateral matching or template matching techniques. Compared to AMVP mode, merge mode does not require signaling an MVD value, as the inferred motion field from spatial or temporal neighboring merge candidates typically provides enough accuracy to achieve an acceptable compression efficiency. However, the MVP candidates of merge mode may not always be accurate for blocks with complex motion. This disclosure introduces a hybrid bi-prediction inter mode that may produce a better trade-off between motion accuracy and signaling overhead when compared to existing bi-prediction inter modes.

In a first example, video encoder 200 and video decoder 300 may be configured to perform hybrid inter bi-prediction (e.g., hybrid-bi mode) using bilateral matching. With the hybrid-bi mode, video encoder 200 and video decoder 300 may be configured to derive a first motion vector by applying an MVD to an MVP. That is, the first motion vector is equal to the MVD plus the MVP. Video encoder 200 may derive the MVD by motion estimation and transmit, by signaling in the bitstream, the MVP and MVD to video decoder 300. In some examples, video encoder 200 may signal the MVP as an index to select a candidate from a first candidate list (e.g., a first candidate list of motion vector predictors). The first candidate list may be constructed as an AMVP candidate list or a merge candidate list, as described above, or may be constructed in another manner.

With the hybrid-bi mode, video encoder 200 and video decoder 300 may be configured to derive a second motion vector by selecting an MVP from a second candidate list (e.g., a second list of candidate motion vector predictors). The second candidate list may be different than the first candidate list. Video encoder 200 and video decoder 300 may be configured to determine the MVP selection based on a minimum bilateral matching error between a first reference block and a second reference block, with the first reference block being derived using the derived first motion vector and the second reference block (for each MVP candidate in the second candidate list) being derived using the MVP candidates in the second candidate list. The second candidate list may be constructed as an AMVP candidate list, a merge candidate list, or using some other construction. The selected MVP of the second predictor is further refined to get the minimum bilateral matching error between the first reference block and the second reference block.

In other words, video encoder 200 and video decoder 300 may be configured to derive a first motion vector by decoding the bitstream and derive a second motion vector using bilateral matching selection and refinement from a candidate list without explicit signaling in the bitstream.

As described above, as part of performing hybrid inter bi-prediction using bilateral matching, video encoder 200 and video decoder 300 may be configured to derive a first predictor from an AMVP candidate list. A first motion vector for bi-prediction may be determined from an MVD and an MVP, where the MVP is the first predictor. Video encoder 200 and video decoder 300 may be configured to derive the MVP from a candidate list that is constructed as AMVP candidate list. For example, video decoder 300 may be configured to derive the first predictor as follows:

1) Receive a first flag (HybridBiFlag), in the bitstream, to indicate whether or not the current block is coded as hybrid inter bi-predicted block.
2) When HybridBiFlag is equal to 1, indicating the current block is coded as a hybrid inter bi-predicted block, receive a second flag (FirstPredictorOnReferenceList0Flag), in the bitstream, indicating whether an MVD is signaled for reference list 0 or reference list 1.

3) Receive an index (FirstPredictorRefIdx), in the bitstream, indicating which reference picture in the determined reference list (FirstPredictorRefList) is used to generate the first predictor.
4) Construct an AMVP candidate list using the determined FirstPredictorRefList and FirstPredictorRefIdx.
5) Receive an index (FirstPredictorMvpIdx), in the bitstream, to indicate which MVP (FirstPredictorMvp) in the AMVP candidate list is used to generate the first predictor.
6) Receive an MVD (FirstPredictorMvd) in the bitstream.
7) Derive the final motion vector (FirstPredictorMv) of the first predictor by applying, e.g., adding, FirstPredictorMvd to FirstPredictorMvp.

As described above, as part of performing hybrid inter bi-prediction using bilateral matching, video encoder 200 and video decoder 300 may be configured to derive a second predictor from a merge candidate list. Video encoder 200 and video decoder 300 may derive the second motion vector using bilateral matching to select an MVP from a merge candidate list based on the minimum bilateral matching error between a first reference block and a second reference block. Video encoder 200 and video decoder 300 may further refine the MVP to determine a minimum bilateral matching error between the first reference block and the second reference block. Video encoder 200 and video decoder 300 may be configured to determine the first reference block using the first motion vector that is derived in the manner described above.

Video decoder 300 may be configured to derive the second final motion vector as follows:
1) Determine a first reference block (FirstRefB lock) using FirstPredictorMvp, FirstPredictorRefList, FirstPredictorRefIdx as described above.
2) Construct a candidate list, such as a merge candidate list.
3) Determine the reference list for the second predictor (SecondPredictorRefList) as SecondPredictorRefList =1—FirstPredictorRefList. That is, if L0 is used to determine the first predictor, then L1 is used to derive the second predictor, or vice versa.
4) Derive a bilateral match cost (costBM[i]) for each MVP candidate in the merge candidate list as follows:
   a) For MVP candidate i (SecondPredictorMvpCand[i]) in the merge candidate list, determine whether or not SecondPredictorMvpCand[i] can be used as a second predictor for the current block based on a condition. The condition may, for example, be that SecondPredictorMvpCand[i] has a predictor at SecondPredictorRefList, such that the reference picture index of SecondPredictorMvpCand[i] at SecondPredictorRefList is not equal to an invalid value/−1). In an example described below, the condition may be further restricted that the reference picture of the first predictor and the reference picture of the second predictor are in different directions relative to the current picture.
   b) When determined that SecondPredictorMvpCand[i] can be used as a second predictor, derive the bilateral matching cost (costBM[i]) by calculating a bilateral matching error between FirstRefB lock and a second reference block (SecondRefBlock[i]). SecondRefBlock [i] is determined using SecondPredictorRefList, SecondPredictorRefIdx[i], and SecondPredictorMvp[i], with SecondPredictorRefIdx[i] and SecondPredictorMvp[i] being the information that is derived from SecondPredictorMvpCand[i].
   c) Otherwise, if determined that SecondPredictorMvpCand[i] cannot be used as a second predictor, then costBM[i] is set to a maximum bilateral matching cost.

5) Determine the second MVP index to be equal to k by comparing costBM[k] to the minimum bilateral matching error of all merge candidates.
6) Derive the final motion vector (SecondPredictorMv) of the second predictor by bilateral matching motion vector refinement as follows:
   a) Derive initial motion vector as SecondPredictorMvp [k].
   b) Bilateral matching motion vector refinement to derive a deltaMV, where the bilateral matching error between FirstRefBlock (in step 1) and SecondRefBlock[k]' is the minimum within the bilateral matching search range or is the minimum in a local search area. SecondRefBlock[k]' may be generated using SecondPredictorMvp[k]+deltaMV as the motion vector.
   c) Derive the final motion vector of the second predictor by set SecondPredictorMv to be equal to SecondPredictorMvp[k]+deltaMV.

Video encoder 200 and video decoder 300 may be configured to generate and process syntax signaling interaction with other inter prediction tools. As in the examples described above with respect to deriving a first predictor from an AMVP candidate list, video encoder 200 may transmit, and video decoder 300 may receive, the flag HybridBiFlag to indicate whether or not the current block is coded as a hybrid inter bi-predicted block.

In some examples, the techniques of this disclosure include not enabling the hybrid-bi mode together with Affine-AMVP and symmetric motion vector difference (SMVD) prediction. In some examples, video encoder 200 may be configured to signal the syntax element HybridBiFlag before the syntax element inter_pred_idc flag, with inter_pred_idc flag indicating the prediction direction (interDir) of the current block. Thus, when the decoded value of the HybridBiFlag is equal to true, video decoder 300 may be configured to implicitly determine, e.g., without decoding specific syntax elements in the bitstream, the following parameters:
   the value of syntax element interDir may implicitly be determined to be 3, meaning the prediction direction is bi direction,
   the value of syntax element affineFlag may implicitly be determined to be false, meaning affine prediction is disabled, and
   the value of syntax element smvdMode may be implicitly determined to be false, meaning SMVD prediction is disabled.

In another example, video encoder 200 may be configured to signal the syntax element HybridBiFlag after Affine-AMVP and SMVD mode. In this case, video decoder 300 may be configured to implicitly determine HybridBiFlag to be false without decoding bitstream when any of the following conditions are fulfilled:
   syntax element inter_pred_idc is not equal to 3, meaning the current block is predicted with uni-prediction,
   syntax element affineFlag is equal to true, meaning affine prediction is enabled, or
   syntax element smvdMode is equal to true meaning SMVD prediction is enabled.

This disclosure also describes techniques in which, when the current block is coded with hybrid inter bi predicted block, video decoder 300 may be configured to use the default adaptive motion vector resolution (AMVR) and bi-prediction with CU-level weights (BCW) prediction for the current block. That is, for a hybrid inter bi predicted block, video decoder 300 may be configured to implicitly determine AMVR parameter as IMV_OFF and BCW parameter as BCW_DEFAULT without decoding bitstream.

As part of performing hybrid inter bi-prediction using bilateral matching, video encoder 200 and video decoder 300 may be configured to operate according to various enabling conditions and other restrictions. In some examples, the techniques of this disclosure include configuring video encoder 200 and video decoder 300 to use several enabling conditions to determine whether or not the hybrid inter bi-prediction process is applicable to a block, or a block in a slice, or a block in a picture. In response to determining that the hybrid inter bi-prediction process is not applicable (or is disabled) to a block, video encoder 200 need not encode a value for HybridBiFlag, and video decoder 300 need not decode a value for HybridBiFlag.

One example of an enabling condition is that the current block is a block of a bi-predictable slice or a bi-predictable sub-picture or a bi-predictable picture. That is, if the current block is included in a slice, sub-picture, or picture that does not support bi-prediction, then video encoder 200 and video decoder 300 may skip the processing of the syntax element HybridBiFlag.

In some examples, the techniques of this disclosure include enabling hybrid inter bi-prediction for a block when at least one reference picture of the block is from the future, in display order, and at least one reference picture is from past, in display order, with respect to the current picture. That is, hybrid inter bi-prediction may be disabled if all reference pictures are to the future of the current picture or all reference pictures are from the past of the current picture. In this context, the past refers to pictures that are before a current picture in output order, and the future refers to pictures that are after the current picture in output order.

For mvdL1ZeroFlag, when the value of mvdL1ZeroFlag is equal to true, video decoder 300 may be configured to implicitly derive that MVD signaling to reference list 1 is set to zero MVD without decoding that bitstream. In the current VVC specification, mvdL1ZeroFlag is a slice parameter.

In some examples, the techniques of this disclosure include that when a block is determined as a hybrid inter bi-prediction coded block and the value of slice parameter mvdL1ZeroFlag is equal to true, the value of FirstPredictorOnReferenceList0Flag is implicitly determined to be equal to true. In other words, for hybrid inter bi-prediction, video decoder 300 may be configured to determine an MVD signaled at reference list 0 without decoding the bitstream. Video decoder 300 may determine a block is coded as a hybrid inter bi-prediction coded block by decoding, from the bitstream, a value of HybridBiFlag that is equal to true.

In some examples, the techniques of this disclosure include disabling hybrid inter bi-prediction when the value of slice parameter mvdL1ZeroFlag of the current block is equal to true. In this case, video encoder 200 and video decoder 300 may be configured to implicitly determine for a block that the value of HybridBiFlag is equal to false without decoding bitstream.

Video encoder 200 and video decoder 300 may also be configured to operate according to other restrictions. As in the example with the final motion vector of the second predictor derivation process described above, there may be a condition to determine whether or not an MVP candidate in the merge candidate list can be used as a second predictor for the current block. In some examples, the techniques of this disclosure include the conditions being as:

If the reference of the first predictor is from future of the current block, the reference of the second predictor should be from past of the current block.

If the reference of the first predictor is from past of the current block, the reference of the second predictor should be from future of the current block.

In other words, the reference pictures of the two predictors should be at different directions relative to the current picture, meaning if the first reference picture is before the current picture in display order, then the second reference picture should be after the current picture in display order, or vice versa.

Figure 9:
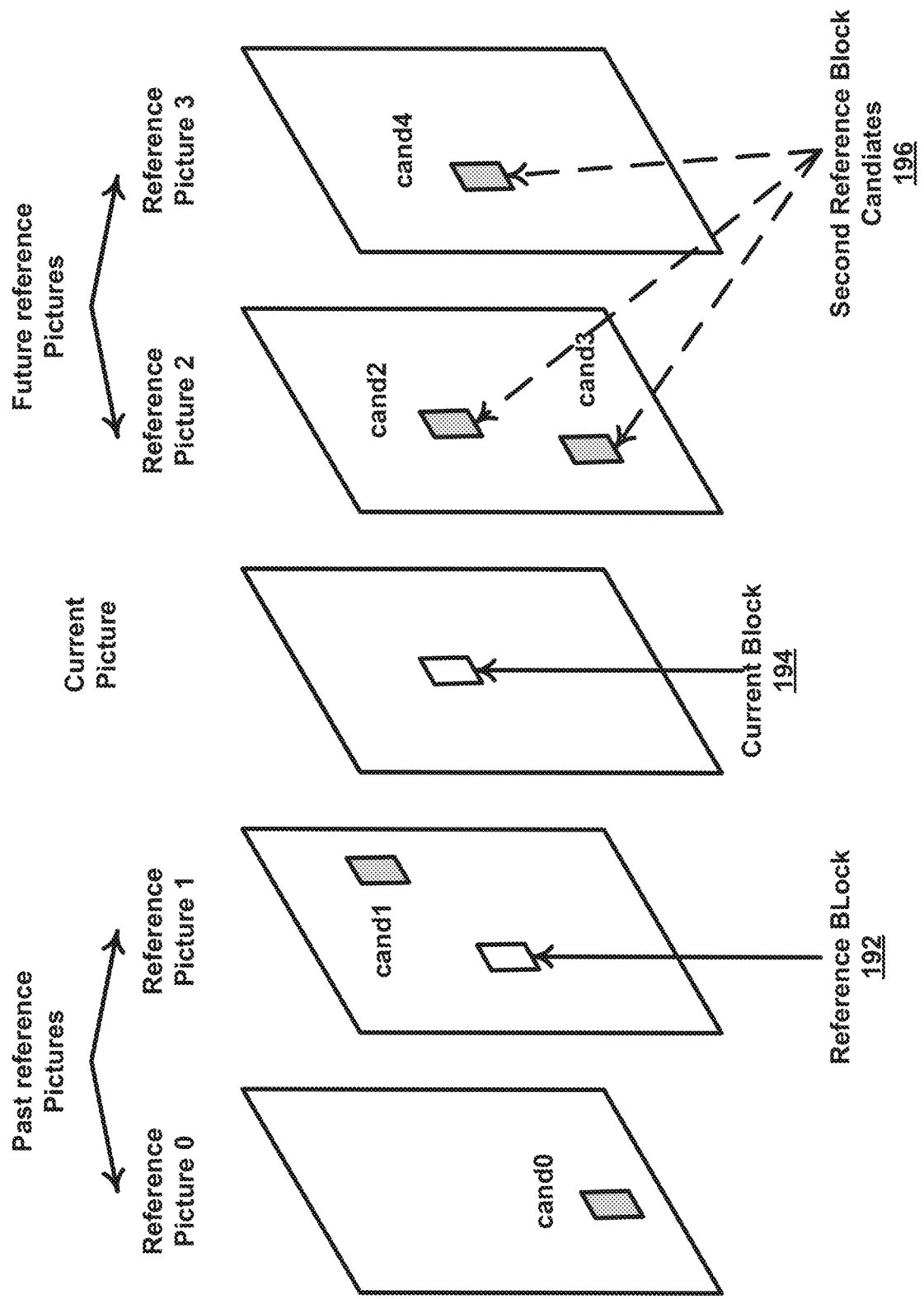
FIG. 9 shows an example of valid candidates for a second predictor when performing hybrid inter bi-prediction using bilateral matching.

FIG. 9 shows an example where the first predictor (reference block 192) for a current block 194 is located in a reference picture (reference picture 1) that is past, or before, the current picture in display order. There are five candidates (cand0 through cand 4) for the second predictor; however, only three of the candidates (second reference block candidates 196) are applicable candidates, because these candidates are in reference pictures (reference pictures 2 and 3) that are to the future, or after, the current picture in display order.

An example of bilateral matching prediction with one fixed template will now be described. As described above with respect to the derivation process for a final motion vector of the second predictor, the bilateral matching motion vector refinement process for the second predictor may be different than the bilateral matching process in the current VVC standard. In the current VVC standard, the bilateral matching motion vector refinement derives a mirrored deltaMV that is applied to the two initial motion vectors of the reference blocks, as shown in FIG. 5.

Figure 10:
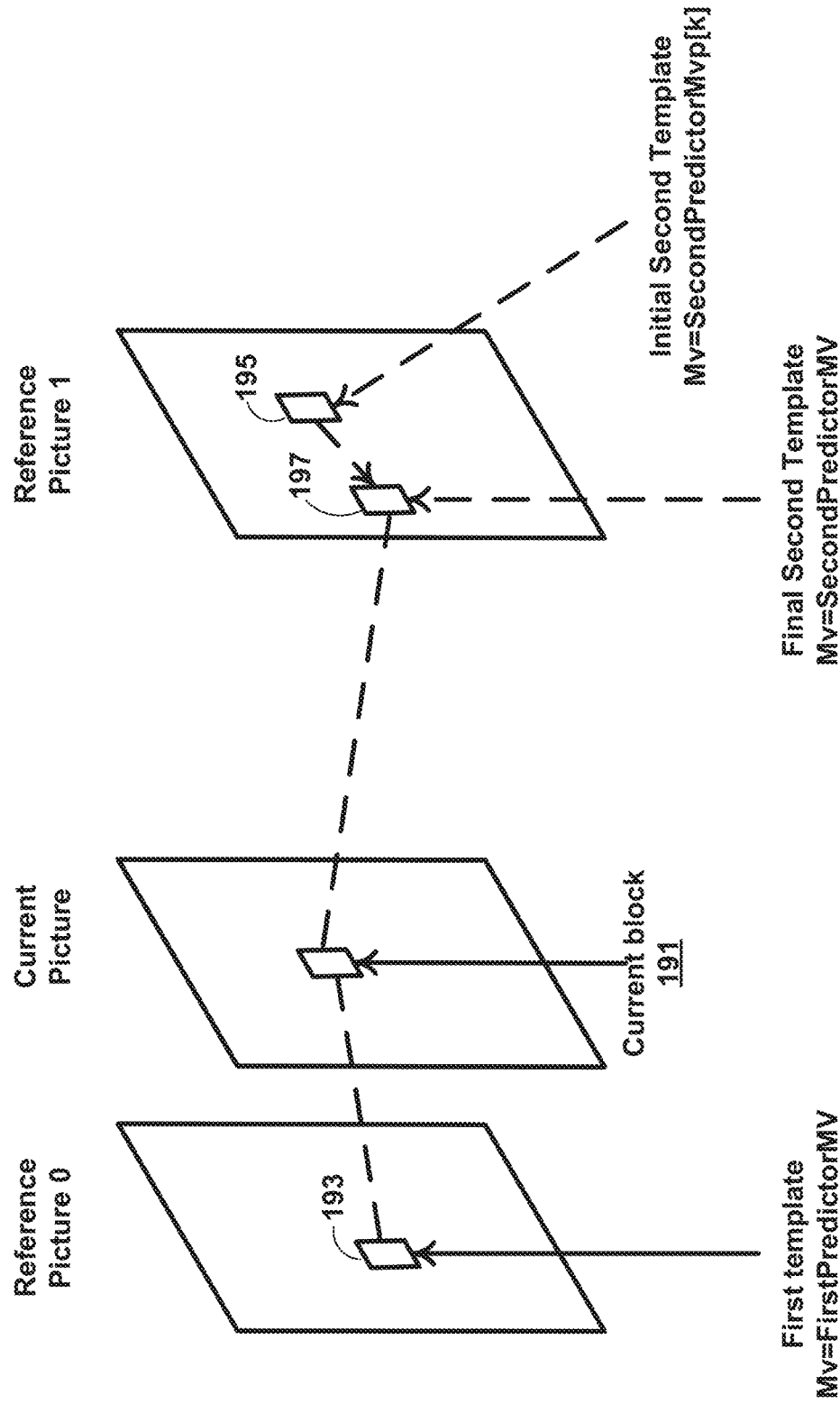
FIG. 10 shows an example of bilateral matching prediction with one fixed template.

FIG. 10 shows an example of bilateral matching prediction with one fixed template. In some examples, video encoder 200 and video decoder 300 may be configured to derive the final second motion vector using bilateral matching motion vector refinement with one fixed template. The fixed template (FirstRefBlock 193) may be derived by FirstPredictorRefList, FirstPredictorRefIdx, and FirstPredictorMvp, as in the examples described above with respect to deriving a first predictor from an AMVP candidate list.

Video encoder 200 and video decoder 300 may be configured to set the initial motion vector of the initial second reference block (195) as SecondPredictorMvp[k] of the determined SecondPredictorMvpCand[k]. The final second reference block 197 (SecondRefBlock[k]) is derived by SecondPredictorRefList, SecondPredictorRefIdx[k] and SecondPredictorMvp[k]+deltaMV. Video decoder 300 may be configured to derive deltaMV by searching within a bilateral matching search range.

In some examples, the search range may be pre-defined as [−8, 8] in the horizontal direction and [−8, 8] in the vertical direction. In some examples, the search range may be adaptively determined by the dimensions of the current block. U.S. patent application Ser. No. 17/101,687 filed on 23 Nov. 2020 and published as U.S. Patent Publication No. 2022/0167001 describes more details about the adaptive search range of bilateral matching prediction.

In some examples, video encoder 200 and video decoder 300 may be configured to derive the value of deltaMV as follows:
1) derive integer pel precision motion vector within the search range that has the minimum bilateral matching error between FirstRefBlock and SecondRefBlock[k].

2) derive half-pel motion vector surrounding the derived integer motion vector that has the minimum bilateral matching error between FirstRefBlock and SecondRefBlock[k].
3) derive fractional motion vector in 1/16 pel precision by parametric error surface based sub-pixel offsets estimation as described above with respect to searching schemes.

Figure 11:
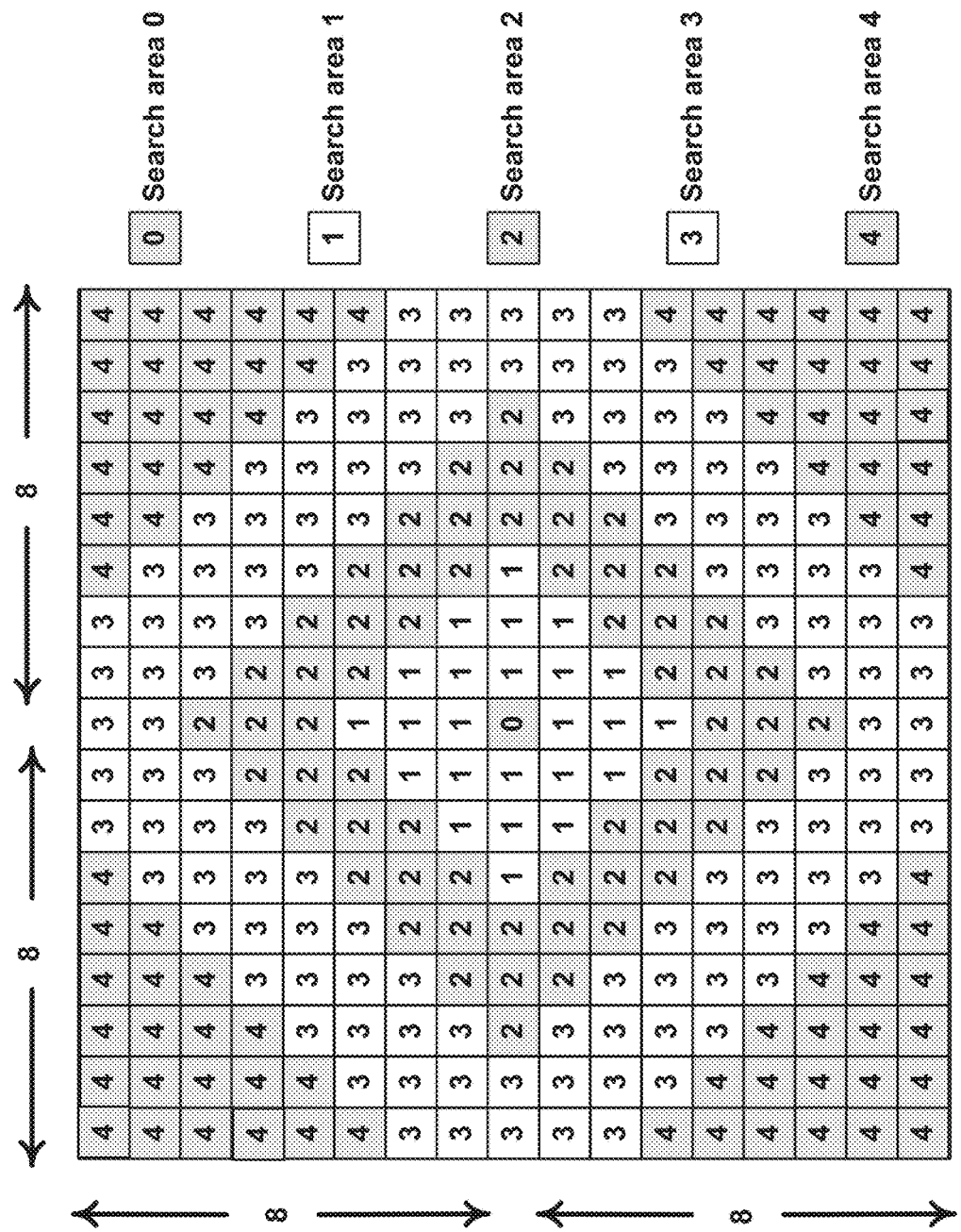
FIG. 11 shows an example of a full search with a skipped search area.

In some examples, for the integer pel precision motion vector search, video encoder 200 and video decoder 300 may be configured to apply a 3×3 square search pattern to reach the local minimum bilateral matching error. In some examples, for the integer pel precision motion vector search, video encoder 200 and video decoder 300 may be configured to apply a full search within the bilateral matching search range to get the minimum bilateral matching error within the search range. In some examples, the search range may be classified to be several diamond search areas, and each search area is assigned with a search priority. In some examples, the full search may examine all search areas. In another example, the full search skips a sub-set of the search areas to reduce the encoder/decoder complexity. FIG. 11 shows an example of the full search with 5 diamond search areas, the search area 0 to 3 are examined to derive integer deltaMV, and the search area 4 is skipped.

As part of performing hybrid inter bi-prediction using bilateral matching, video encoder 200 and video decoder 300 may be configured to utilize an alternative first reference block. As in the above-mentioned example, the first reference block (FirstRefBlock) is derived by using FirstPredictorMvp, FirstPredictorRefList, FirstPredictorRefIdx, as discussed above with respect to deriving a first predictor from an AMVP candidate list. The motion vector that is used to derive the first reference block is the derived MVP of the first predictor.

In some examples, the techniques of this disclosure include using an alternative first reference block which is derived by using the final motion vector (FirstPredictorMv) of the first predictor. Video encoder 200 and video decoder 300 may be configured to derive FirstPredictorMv by applying FirstPredictorMvp to FirstPredictorMvp.

As part of performing hybrid inter bi-prediction using bilateral matching, video encoder 200 and video decoder 300 may be configured to perform an alternative determination of FirstPredictorMvp. Compared to the aforementioned techniques described above for deriving a first predictor from an AMVP candidate list, FirstPredictorRefIdx and FirstPredictorMvpIdx may be signaled to derive FirstPredictorMvp by selecting an MVP from an MVP candidate list. In some examples, the techniques of this disclosure include using alternative way to implicitly determine FirstPredictorMvp without signaling. One example technique is to select an MVP from an MVP candidate list based on the minimum template matching error.

As part of performing hybrid inter bi-prediction using bilateral matching, video encoder 200 and video decoder 300 may be configured to perform an alternative determination of SecondPredictorMvp.

Compared to the aforementioned techniques for deriving a second predictor from a merge candidate list, when deriving SecondPredictorMvp[k], the indices of MVP candidate list k is implicitly determined based on minimum bilateral matching error. In some examples, the techniques of this disclosure include using an alternative way to explicitly determine SecondPredictorMvp by signaling one or several indices to select an MVP candidate from an MVP candidate list. A coding mode of the current block may be used to determine whether SecondPredictorMvp is implicitly determined based on minimum bilateral matching error or is explicitly determined using explicit signaling of one or several indices.

In another example, when FirstPredictorMvp and/or SecondPredictorMvp is determined using a signaled index to select an MVP from an MVP candidate list, video encoder 200 and video decoder 300 may be configured to sort the MVP candidate list to prioritize the most trustable MVP candidate. By doing this, the signaling cost of the MVP index may be reduced. The sort of the MVP candidate list may be based on bilateral matching error, or template matching error. The example described above for deriving a second predictor from a merge candidate list may be considered a special case, where the merge candidate list is sorted based on bilateral matching error, and the first MVP candidate in the sorted MVP candidate list is implicitly selected without signaling an index in the bitstream.

As part of performing hybrid inter bi-prediction using bilateral matching, video encoder 200 and video decoder 300 may be configured to perform bilateral matching motion vector refinement for both the first and second predictor MVP. The aforementioned examples illustrate the bilateral matching process using one fixed template (generated by the motion vector information of the first predictor) to refine the second predictor MVP. In some examples, the techniques of this disclosure include using bilateral matching to refine both FirstPredictorMvp and the determined SecondPredictorMvp[k]. The bilateral matching motion vector refinement uses FirstPredictorMvp and SecondPredictorMvp[k] as initial motion vectors. The bilateral matching process search around the initial motion vectors within the predetermined search range. The final motion vector FirstPredictorMvp' and SecondPredictorMvp[k]' are derived based on minimum bilateral matching error. The MVD between the final motion vector and the initial MV, denoted by (FirstPredictorMvp'—FirstPredictorMvp) and (SecondPredictorMvp[k]'—SecondPredictorMvp[k]), are proportional to the temporal distances between the current picture and the two reference pictures, as described above with respect to bilateral matching prediction. In some examples, the mirrored MVD, regardless of the temporal distances, may be applied, as in FIG. 5.

As described above with respect to deriving a first predictor from an AMVP candidate list, the final motion vector of the first predictor FirstPredictorMv is then derived by applying derived FirstPredictorMvd to the refined first predictor MVP FirstPredictorMvp'.

Video encoder 200 and video decoder 300 may derive the second final motion vector in a manner similar to that described above with respect to deriving a second predictor from a merge candidate list.

As part of performing hybrid inter bi-prediction using bilateral matching, video encoder 200 and video decoder 300 may be configured to perform a combination of Conventional-BM and One-Template-BM.

In some examples, this disclosure describes using a combination of bilateral matching refinement for both first and second predictor MVP, as described above, referred to as Conventional-BM and bilateral matching refinement, for only the second predictor MVP. This technique may be referred to as one-Template-BM.

In some examples, video encoder 200 and video decoder 300 may be configured to implicitly determine the usage of Conventional-BM or One-Template-BM by one derived parameter of the first predictor.

For example, when the number of MVP candidates of the first MVP candidate list is greater than 1, video decoder 300 may be configured to use the signaled MVP index to determine the usage of Conventional-BM or One-Template-BM. When FirstPredictorMvpIdx is equal to 0, BM process uses Conventional-BM, otherwise, BM process uses One-Template-BM.

For another example, when the number of MVP candidates of the first MVP candidate list is equal to 1, video decoder 300 may be configured to use the signal reference index to determine the usage of Conventional-BM or One-Template-BM. When FirstPredictorRefIdx is equal to 0, BM process uses Conventional-BM, otherwise, BM process uses One-Template-BM.

In another example, the usage of Conventional-BM or One-Template-BM may be determined by decoding a flag from the bitstream.

Video encoder 200 and video decoder 300 may be configured to perform high level syntax signaling. As described above with respect to the enabling condition and other restriction, the hybrid inter bi-prediction may not be applied to the blocks in a current slice or picture when the enabling condition or the restrictions are not satisfied. Some high-level syntax elements may be used to indicate whether hybrid inter bi-prediction is to be applied.

In one example, hybrid inter bi-prediction can be disabled for a coded picture or slice according to the available reference pictures. Certain conditions may be applied to the reference pictures to enable hybrid inter bi-prediction. Examples of conditions may include:

There must be at least one pair of reference pictures that one reference picture in the past and the other in the future relative to the current picture.

Both of the reference pictures are not long-term reference pictures.

Both of the reference pictures have the same resolution as current picture.

The conditions listed above can be used separately or in a combination. When the conditions are not satisfied, the hybrid inter bi-prediction is disabled for that picture/slice, therefore the corresponding block level syntax elements of the hybrid inter bi-prediction are not signaled and hybrid inter bi-prediction is inferred to be not applied.

In another example, a slice/picture level flag can be introduced for hybrid inter bi-prediction, as a bitstream conformance constraint that flag is set to 0, if there is at least one condition from the above that is not satisfied.

In yet another example, a bitstream conformance constraint is introduced to the existing signaling that the hybrid inter bi-prediction is not applied and the corresponding overhead set to 0, indicating that the process is not used, if at least one of the above conditions is not satisfied.

Video encoder 200 and video decoder 300 may be configured to perform merge list padding. As described above with respect to deriving a second predictor from a merge candidate list, when the second predictor is derived from a merge candidate list, and the merge list has less than predefined number of candidates, a padding process may be applied to merge list construction.

In some examples, the reference pictures assigned to the padded zero motion vector candidates can satisfy some conditions for the hybrid inter bi-prediction. Examples of those conditions may include one or multiple of the following (also discussed above):

There must be at least one pair of reference pictures that one reference picture in the past and the other in the future relative to the current picture.

Both of the reference pictures are not long-term reference pictures.

Both of the reference pictures have the same resolution as the current picture.

All possible zero motion vector candidates can be found by looping over all possible combinations of reference pictures and identify those reference pictures that satisfy the predefined conditions in a certain order. For example, the first loop is performed for List 0 and the second loop is performed for List 1, or vice versa. Other orderings are also possible. The process may be performed at a slice/picture level, and the list of the found zero motion vector candidates are stored as default candidates. At the block level, when the number of candidates is less than the predefined maximum number of candidates, a process can loop over the default candidates to add into the candidate list until the number of candidates reaches the predefined maximum.

Video encoder 200 and video decoder 300 may be configured to adapt a number of reference pictures. As in the example above for enabling conditions and other restrictions, when the hybrid inter bi-prediction is applied to the current block, the number of reference pictures may be less than the number of reference pictures that is signaled in the slice or picture level.

In this example, video encoder 200 and video decoder 300 may be configured to check each reference picture in the reference picture list to determine the number of reference pictures for a block that is coded by hybrid inter bi-prediction. When a reference picture satisfies some certain conditions for hybrid inter bi-prediction, the reference picture is determined to be a candidate reference picture. Examples of those conditions may include one or multiple of the following (also discussed above):

There must be at least one pair of reference pictures that has one reference picture in the past and the other in the future relative to the current picture.

Both of the reference pictures are not long-term reference pictures.

Both of the reference pictures have the same resolution as the current picture.

In one example, the number of reference pictures that is signaled in the slice/picture level is 2. If after checking the above conditions, a first reference picture satisfies the conditions while a second reference picture does not, then video encoder 200 and video decoder 300 may be configured to set the number of reference pictures to 1. The index of reference pictures may not be signaled in the bitstream but instead implicitly determined to be 0.

Video encoder 200 and video decoder 300 may be configured to operate according to a FirstPredictorMvd signaling condition. As described above with respect to deriving a first predictor from an AMVP candidate list, the FirstPredictorMvd may, in some examples, always be signaled in the bitstream. The first final motion vector (FirstPredictorMv) is derived by applying FirstPredictorMvd to FirstPredictorMvp for the first predictor.

In some examples, the FirstPredictorMvd is signaled in the bitstream when certain conditions are satisfied. In some examples, the condition is to check whether the value of FirstPredictorMvpIdx is equal to a first value K. For example, when the FirstPredictorMvpIdx is equal to K, the FirstPredictorMvd is signaled in the bitstream. The first value K may be one integer value, e.g., 0 or 1, or the first value K may be a set of integer values, e.g., {0, 1, 2}. In some examples, the condition is to check whether the value of FirstPredictorRefIdx is equal to a first value M. For example, when the FirstPredictorRefIdx is equal to M, the FirstPredictorMvd is signaled in the bitstream. The first value M may be one integer value (e.g., 0 or 1) or may be a set of integer values (e.g., {0, 1, 2}). In some examples, the condition is to check the value of FirstPredictorMvpIdx is equal to a first value K and the value of FirstPredictorRefIdx is equal to a first value M. In other words, the condition is to check a combination of the value of FirstPredictorMvpIdx and the value of FirstPredictorRefIdx.

Video decoder 300 may be configured to determine a second prediction MVP by a signaled index and the bilateral matching cost. As described above with respect to deriving a second predictor from a merge candidate list, video decoder 300 may determine a second MVP index to be equal to k by comparing costBM[k] to the minimum bilateral matching error of all merge candidates.

In some examples, the second MVP index is determined by a signaled index SecondPredictorMvpIdx and the bilateral matching cost costBM[i] of each merge candidate. The value of SecondPredictorMvpIdx indicates an index of the sorted values of costBM[i] in increasing order. When the value of SecondPredictorMvpIdx is equal to 0, the second MVP is determined to be equal to k, with costBM[k] having the minimum bilateral matching error of all merge candidates. When the value of SecondPredictorMvpIdx is equal to 1, the second MVP is determined to be equal to p, with costBM[p] having the second minimum bilateral matching error of all merge candidates.

Video encoder 200 and video decoder 300 may be configured to operate according to a SecondPredictorMvpIdx signaling condition. In this example, SecondPredictorMvpIdx is signaled in the bitstream when certain conditions are satisfied. In some examples, the condition is to check whether the value of FirstPredictorMvpIdx is equal to a first value K. For example, when the FirstPredictorMvpIdx is equal to K, the SecondPredictorMvpIdx is signaled in the bitstream. The first value K may be one integer value, e.g., 0 or 1, or the first value K may be a set of integer values, e.g., {0, 1, 2}. In some examples, the condition is to check whether the value of FirstPredictorRefIdx is equal to a first value M. For example, when the FirstPredictorRefIdx is equal to M, the SecondPredictorMvpIdx is signaled in the bitstream. The first value M may be one integer value, e.g., 0 or 1, or the first value M may be a set of integer values, e.g., {0, 1, 2}. In some examples, the condition is to check whether the value of FirstPredictorMvpIdx is equal to a first value K and the value of FirstPredictorRefIdx is equal to a first value M. In other words, the condition is to check a combination of the value of FirstPredictorMvpIdx and the value of FirstPredictorRefIdx. In some examples, the SecondPredictorMvpIdx signaling condition is the same as the FirstPredictorMvd signaling condition.

In a second example, video encoder 200 and video decoder 300 may be configured to perform hybrid inter bi-prediction using template matching. In this example, the techniques of this disclosure include deriving the second predictor of the hybrid-bi mode by using template matching techniques.

As part of performing hybrid inter bi-prediction using template matching, video encoder 200 and video decoder 300 may be configured to derive a first predictor from an AMVP candidate list. The first predictor derivation process may be the same as described above with respect to performing hybrid inter bi-prediction using bilateral matching.

As part of performing hybrid inter bi-prediction using template matching, video encoder 200 and video decoder 300 may be configured to derive a second predictor from a merge candidate list. In some examples, the final motion vector of the second predictor may be derived by using template matching to select an MVP from a merge candidate list based on the minimum template matching error between the current block template and the reference block template. The selected MVP is further refined to get minimum template matching error between the current block template and the reference block template. The current block template may be derived from the above and/or left neighboring reconstructed blocks as described above with respect to template matching prediction.

In some examples, the reference block template may be derived by uni-prediction which uses the information of a candidate in the merge candidate list. In another example, the reference block template is derived by bi-prediction which uses the information of a candidate in the merge candidate list and the derived information of the first predictor, e.g., FirstPredictorMvp, FirstPredictorRefList and FirstPredictorRefIdx that are derived as discussed above with respect to deriving a first predictor from an AMVP candidate list.

The final motion vector of the second predictor is derived as follows:
1) Derive FirstPredictorMvp, FirstPredictorRefList, FirstPredictorRefIdx as described above.
2) Construct a merge candidate list.
3) Derive the current block template (CurBlockTemplate) from the above and/or left neighboring reconstructed blocks.
4) Determine reference list of the second predictor (SecondPredictorRefList) as SecondPredictorRefList =1—FirstPredictorRefList.
5) Derive a template match cost (costTM[i]) for each MVP candidate in the merge candidate list as follows:
   a) At MVP candidate i (SecondPredictorMvpCand[i]) in the merge candidate list, determine whether or not SecondPredictorMvpCand[i] can be used as a second predictor for the current block by a condition, e.g., SecondPredictorMvpCand[i] does not have a predictor at SecondPredictorRefList (the reference picture index of SecondPredictorMvpCand[i] at SecondPredictorRefList is equal to an invalid value/−1). As described above with respect to performing hybrid inter bi-prediction using bilateral matching, the condition may be further restricted that the reference picture of the first predictor and the reference picture of the second predictor are in different directions relative to the current picture, as determined by the respective reference picture lists and reference picture indexes.
   b) When determined that SecondPredictorMvpCand[i] can be used as a second predictor, derive a template matching cost (costTM[i]) by calculating template matching error between CurBlockTemplate and a reference block template (RefBlockTemplate[i]).
      i) (uni-prediction reference template) RefBlockTemplate[i] is derived from above and/or left neighboring reconstructed blocks of a reference block in a reference picture. The reference picture may be determined by SecondPredictorRefList, SecondPredictorRefIdx[i]. The position of the reference block may be determined by SecondPredictorMvp[i] and the position of the current block.
      ii) (bi-prediction reference template) RefBlockTemplate[i] is derived from equal weight bi-prediction of a first reference block template block and a second reference block template. The first reference block template may be above and/or left neighboring reconstructed blocks of a first reference block in a first reference picture. The first reference picture may be determined by FirstPredictorRefList, FirstPredictorRefIdx. The position of the first reference block may be determined by FirstPredictorMvp and the position of the current block. The second reference block template may be above and/or left neighboring reconstructed blocks of a second reference block in a second reference picture. The second reference picture may be determined by SecondPredictorRefList, SecondPredictorRefIdx[i]. The position of the second reference block may be determined by SecondPredictorMvp[i] and the position of the current block.

c) Otherwise, (when determined that SecondPredictorMvpCand[i] cannot be used as a second predictor), costTM[i] is set to maximum template matching cost.

6) Determine the second MVP index to be equal to k by comparing costTM[k] is the minimum template matching error of all merge candidates.

7) Derive the final motion vector (SecondPredictorMv) of the second predictor by template matching motion vector refinement as follows:
   a) Derive initial motion vector as SecondPredictorMvp[k].
   b) Template matching motion vector refinement to derive a deltaMV, where the template matching error between CurBlockTemplate (in step 1) and RefBlockTemplate[k]' is the minimum within the template matching search range or is the minimum in a local search area. The RefBlockTemplate[k]' may be generated by using SecondPredictorMvp[k]+deltaMV as the motion vector.
   c) Derive the final motion vector of the second predictor by set SecondPredictorMv to be equal to SecondPredictorMvp[k]+deltaMV.

Video encoder 200 and video decoder 300 may be configured to perform template matching. Template matching is a decoder-side motion vector derivation process to refine the motion information of the current CU by finding the closest match between a template (e.g., the top and/or left neighboring blocks of the current CU) in the current picture and a block (i.e., same size to the template) in a reference picture. As illustrated in FIG. 7, a better motion vector is searched around the initial motion of the current CU within a [−8, +8]-pel search range. The template matching process in Y. Chen, et. al, "Description of SDR, HDR and 360° video coding technology proposal by Qualcomm and Technicolor—low and high complexity versions," Joint Video Exploration Team (WET) of ITU-T SG 16 WP 3 and ISO/IEC JTC 1/SC 29/WG 11, 10th Meeting: San Diego, US, 10-20 April 2018 (JVET-J0021) is used with the following modifications: search step size is determined based on AMVR mode and template matching can be cascaded with bilateral matching process in merge modes.

In AMVP mode, an MVP candidate is determined based on template matching error to select the candidate which reaches the minimum difference between the current block template and the reference block template, and then template matching is performed only for this particular MVP candidate for motion vector refinement. Template matching refines this MVP candidate, starting from full-pel MVD precision (or 4-pel for 4-pel AMVR mode) within a [−8, +8]-pel search range by using an iterative diamond search. The AMVP candidate may be further refined by using cross search with full-pel MVD precision (or 4-pel for 4-pel AMVR mode), followed sequentially by half-pel and quarter-pel precisions depending on the AMVR mode, as specified in Table 1. This search process ensures that the MVP candidate still keeps the same motion vector precision as indicated by the AMVR mode after the template matching process.

TABLE 1

Search patterns of AMVR and merge mode with AMVR.

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, a similar search process is applied to the merge candidate indicated by the merge index. As Table 1 shows, template matching may perform all the way down to 1/8-pel MVD precision or skipping those beyond half-pel MVD precision, depending on whether the alternative interpolation filter (that is used when AMVR is of half-pel mode) is used according to merged motion information. Besides, when template matching mode is enabled, template matching may work as an independent process or an extra motion vector refinement process between block-based and sub-block-based bilateral matching processes, depending on whether bilateral matching can be enabled or not according to its enabling condition check.

Video encoder 200 and video decoder 300 may be configured to perform a multi-pass DMVR as set forth in ECM. A multi-pass decoder-side motion vector refinement is applied, in some examples of ECM. In the first pass, bilateral matching is applied to the coding block. In the second pass, bilateral matching is applied to each 16×16 subblock within the coding block. In the third pass, a motion vector in each 8×8 subblock is refined by applying bi-directional optical flow (BDOF). The refined motion vectors are stored for both spatial and temporal motion vector prediction.

Video encoder 200 and video decoder 300 may be configured to perform a first pass with block-based bilateral matching motion vector Refinement. In the first pass, a refined motion vector is derived by applying bilateral matching to a coding block. Similar to decoder-side motion vector refinement (DMVR), in bi-prediction operation, a refined motion vector is searched around the two initial motion vectors (MV0 and MV1) in the reference picture lists L0 and L1. The refined motion vectors (MV0_pass1 and MV1_pass1) are derived around the initial motion vectors based on the minimum bilateral matching cost between the two reference blocks in L0 and L1.

Bilateral matching performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until video decoder 300 reaches the end of the search range.

The existing fractional sample refinement is further applied to derive the final deltaMV. Video encoder 200 and video decoder 300 may then derive the refined motion vectors after the first pass as:

$$MV0\_pass1=MV0+deltaMV$$

$$MV1\_pass1=MV1-deltaMV$$

Video encoder 200 and video decoder 300 may be configured to perform a second pass, with subblock-based bilateral matching motion vector refinement. In the second pass, a refined motion vector is derived by applying bilateral matching to a 16×16 grid subblock. For each subblock, a refined motion vector is searched around the two motion vectors (MV0_pass1 and MV1_pass1), obtained on the first pass, in the reference picture list L0 and L1. The refined motion vectors (MV0_pass2(sbIdx2) and MV1_pass2(sbIdx2)) are derived based on the minimum bilateral matching cost between the two reference subblocks in L0 and L1.

For each subblock, bilateral matching performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated by applying a cost factor to the sum of absolute transformed differences (SATD) cost between two reference subblocks, as: bilCost=satdCost*costFactor. The search area (2*sHor+1)*(2*sVer+1) is divided up to 5 diamond shape search regions shown in FIG. 11. Each search region is assigned a cost-Factor, which is determined by the distance (intDeltaMV) between each search point and the starting motion vector, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined. FIG. 11 shows example diamond regions in the search area.

The existing VVC DMVR fractional sample refinement is further applied to derive the final deltaMV(sbIdx2). Video encoder 200 and video decoder 300 may then derive the refined motion vectors after the second pass as:

$$MV0\_pass2(sbIdx2)=MV0\_pass1+deltaMV(sbIdx2)$$

$$MV1\_pass2(sbIdx2)=MV1\_pass1-deltaMV(sbIdx2)$$

Video encoder 200 and video decoder 300 may be configured to perform a third pass with subblock-based Bi-Directional Optical Flow (BDOF) motion vector refinement. In the third pass, a refined motion vector is derived by applying BDOF to an 8×8 grid subblock. For each 8×8 subblock, BDOF refinement is applied to derive scaled Vx and Vy without clipping starting from the refined motion vector of the parent subblock of the second pass. The derived bioMv(Vx, Vy) is rounded to 1/16 sample precision and clipped between −32 and 32.

Video encoder 200 and video decoder 300 may then derive the refined motion vectors (MV0_pass3(sbIdx3) and MV1_pass3(sbIdx3)) after the third pass as:

$$MV0\_pass3(sbIdx3)=MV0\_pass2(sbIdx2)+bioMv$$

$$MV1\_pass3(sbIdx3)=MV0\_pass2(sbIdx2)-bioMv$$

In M. Coban, F. Le Léannec and J. Ström, "Algorithm description of Enhanced Compression Model 2 (ECM 2)" JVET-W2025, Jul. 2021, the inter coding techniques of multi-pass decoder-side motion vector refinement (MPDVMR) and template matching (template matching merge and template matching AMVP) have significant room for improvement in terms of coding efficiency.

This disclosure has described above a hybrid inter bi-prediction process to improve coding efficiency. This disclosure also describes the hybrid inter bi-prediction process interaction with MPDMVR, template matching merge and template matching AMVP processes. This disclosure also describes techniques for improving the coding efficiency of the hybrid inter bi-prediction process. The examples described below may be used separately or together in any combination.

A first example of Adaptive Second Predictor Derivation will now be described. As described above, the hybrid inter bi-prediction process has a first predictor which is derived by decoding the bitstream and a second predictor is derived without decoding the bitstream. In the second predictor derivation process, a matching error is calculated for each candidate. A candidate that has the minimum matching error is selected. It is predetermined that the matching error is calculated by either bilateral matching or template matching.

This first example technique uses several parameters. These parameters are used in the second predictor derivation process. Some of the parameters are predefined at both video encoder 200 and video decoder 300. Some of the parameters are derived from decoding bitstream.

Video encoder 200 and video decoder 300 may be configured to utilize matching function parameters. This example describes a high-level parameter, called MatchingFunctionHighLevel and a low-level parameter, called MatchingFunctionLowLevel. The high-level parameter is a parameter that can be used for a video sequence, a picture set of a video sequence, a picture, a slice, a subpicture, a tile, a CTU or pre-determined region in a video codec. The low-level parameter is a parameter that is used for a block (e.g., coding unit or prediction unit), where the parameter can be signaled in bitstream or derived based on whichever matching function can reach a lower matching cost.

The parameters indicate which matching function is used in the second predictor derivation process.

When the value of MatchingFunctionHighLevel is equal to a first value (e.g., 0), indicating that a block can only use template matching function. The value of MatchingFunctionLowLevel is determined to be equal to a fourth value (e.g., 0). The matching error for each candidate is calculated by using template matching for the current block.

When the value of MatchingFunctionHighLevel is equal to a second value (e.g., 1), indicating that a block can only use a bilateral matching function. The value of MatchingFunctionLowLevel is determined to be equal to a fifth value (e.g., 1). The matching error for each candidate is calculated by using bilateral matching for the current block.

When the value of MatchingFunctionHighLevel is equal to a third value (e.g., 2), indicating that a block may use bilateral matching function or template matching function. The value of MatchingFunctionLowLevel is derived by decoding a flag from the bitstream.

When the value of the decoded flag is equal to a sixth value (e.g., 0), the value of MatchingFunctionLowLevel is determined to be equal to a fourth value (e.g., 0). The matching error for each candidate is calculated by using template matching for the current block.

When the value of the decoded flag is equal to a seventh value (e.g., 1), the value of MatchingFunctionLowLevel is determined to be equal to a fifth value (e.g., 1). The matching error for each candidate is calculated by using bilateral matching for the current block.

In one example, a high-level parameter (e.g., MatchingFunctionHighLevel) may be signaled in the bitstream as a parameter of an SPS, PPS, PH, subpicture header, SH, tile, and/or CTU.

In one example, the proposed high-level parameters are predefined and synchronized in both the encoder and decoder.

In one example, when the matching function is determined to be template matching for the current block, but the current block does not have a template (e.g., the top and left neighboring blocks of the current block are not available), the matching error for each candidate of the current block is calculated by using bilateral matching.

Video encoder 200 and video decoder 300 may be configured to determine a candidate index of second predictor parameters. This example proposes the use of a high-level parameter namely MaxNumSecondPredCandHighLevel, a low-level parameter namely NumSecondPredCandLowLevel and a low-level parameter namely SecondPredCandIdxLowLevel. The high-level parameter, MaxNumSecondPredCandHighLevel, is a parameter that can be used for a video sequence, a picture set of a video sequence, a picture, a subpicture, a tile, a slice or a CTU. The low-level parameter is a parameter that is used for a block.

The parameter MaxNumSecondPredCandHighLevel indicates the maximum number of candidates are selected from the candidate list. The value of MaxNumSecondPredCandHighLevel ranges from 1 to K, wherein, K is a predefined value and K can be greater than or equal to 1.

When the number of candidates in the current block's candidate list is equal to N and N is equal or smaller than MaxNumSecondPredCandHighLevel, the value of NumSecondPredCandLowLevel is set to be equal to N.

Otherwise, (when N is greater than MaxNumSecondPredCandHighLevel), the value of NumSecondPredCandLowLevel is set to be equal to MaxNumSecondPredCandHighLevel.

The parameter SecondPredCandIdxLowLevel indicates which candidate in the current block's candidate list is used as the candidate of the second predictor. The value of SecondPredCandIdxLowLevel ranges from 0 to (NumSecondPredCandLowLevel −1). When the value of SecondPredCandIdxLowLevel is equal to 0, the candidate that has a minimum matching error is used as the candidate of the second predictor. When the value of SecondPredCandIdxLowLevel is equal to 1, the candidate that has the second smallest matching error is used as the candidate of the second predictor, etc.

When the determined value of NumSecondPredCandLowLevel is equal to 1, the value of SecondPredCandIdxLowLevel is determined to be equal to 0.

When the determined value of NumSecondPredCandLowLevel is greater than 1, the value of SecondPredCandIdxLowLevel is derived by decoding bitstream.

Accordingly, in one example of the disclosure, video encoder 200 and video decoder 300 may be configured to derive a first predictor for a hybrid inter bi-prediction process, derive a second predictor for the hybrid inter bi-prediction process based on a high-level parameter and a low-level parameter, and code a block of video data using the hybrid inter-prediction process according to the first predictor and the second predictor.

In one example, the high-level parameter is used for one or more of a video sequence, a picture set of a video sequence, a picture, a slice, a subpicture, a tile, a CTU, or a predetermined region.

In one example, the low-level parameter is used for the block, including one or more of coding unit or a prediction unit.

In one example, one or more of the high-level parameter or the low-level parameter indicate a matching function used to derive the second predictor.

In one example, the high-level parameter indicates a maximum number of candidates from a candidate list.

In one example, the second low-level parameter indicates a candidate in the candidate list to use to derive the second predictor.

A second example of motion vector refinement will now be described. As described above, when the second predictor derivation process applies bilateral matching, the motion vector of the selected second candidate is refined by minimizing a bilateral matching error. When the DMVR enabling conditions (e.g., DMVR enabling conditions described above) are not satisfied for the current block, the motion vector refinement process is skipped.

As described above, when the second predictor derivation process applies template matching, the motion vector of the selected second candidate is refined by minimizing a template matching error. When the current block does not have a template (e.g., the top and left neighboring blocks of the current block are not available), the motion vector refinement process is skipped Video encoder 200 and video decoder 300 may be configured to implement MatchingFunctionLowLevel indicated block-based motion vector refinement. The value of MatchingFunctionLowLevel is determined as described above with respect to the first example for Adaptive Second Predictor Derivation.

When the value of MatchingFunctionLowLevel indicates that bilateral matching function is used in the second predictor derivation process, the motion vector of the selected candidate is refined by minimizing a bilateral matching error.

When the value of MatchingFunctionLowLevel indicates that template matching function is used in the second predictor derivation process, the motion vector of the selected candidate is refined by minimizing a template matching error.

Video encoder 200 and video decoder 300 may be configured to prioritize bilateral matching block-based motion vector refinement. This example proposes a predefined block-based motion vector refinement process that is independent to the value of MatchingFunctionLowLevel.

To implement the proposed block-based motion vector refinement process, video encoder 200 and video decoder 300 may be configured to do the following steps in order:
  Check whether the DMVR enabling condition is satisfied or not, if determined that the DMVR enabling condition is satisfied, block-based DMVR motion vector refinement is applied to the current block (e.g., as the First pass of BDMVR described above).
  Otherwise, (when determined that the DMVR enabling condition is not satisfied), check whether the current block template is available (e.g., the top and/or left neighboring blocks of the current block are available), if determined that the current block template is available, block-based template matching motion vector refinement is applied to the current block.
  Otherwise, the block-based motion vector refinement is skipped for the current block.

Video encoder 200 and video decoder 300 may be configured to prioritize template matching block-based motion vector refinement. This example describes a predefined block-based motion vector refinement process that is independent to the value of MatchingFunctionLowLevel.

To implement proposed block-based motion vector refinement process, video encoder 200 and video decoder 300 may be configured to do the following steps in order:
  Check whether the current block template is available (e.g., the top and/or left neighboring blocks of the current block are available), if determined that the current block template is available, block-based template matching motion vector refinement is applied to the current block.
  Otherwise, (when determined that the current block template is not available), check whether the DMVR enabling condition is satisfied or not, if determined that the DMVR enabling condition is satisfied, block-based DMVR motion vector refinement is applied to the current block (e.g., as First pass of BDMVR as described above).
  Otherwise, the block-based motion vector refinement is skipped for the current block In another example, the selection of the prioritizing processes, as described above with respect to prioritizing bilateral matching block-based motion vector refinement and prioritizing template matching block-based motion vector refinement, is indicated by a flag in the bitstream at sequence, picture, subpicture, slice, tile, CTU and/or block level.

In the second example, video encoder 200 and video decoder 300 may be configured to perform subblock-based motion vector refinement. This example describes an MPDMVR subblock-based motion vector refinement to a hybrid inter bi-prediction coded block.

In one example, when the DMVR enabling condition is satisfied, both the Second pass (e.g., as described above) and a Third pass (e.g., as described above) subblock-based motion vector refinement are applied to the current block.

In one example, when the DMVR enabling condition is satisfied, only the Third pass (e.g., described above) subblock-based motion vector refinement is applied to the current block.

Video encoder 200 and video decoder 300 may be configured to implement DMVR enabling conditions. As in the second example with respect to examples for MatchingFunctionLowLevel indicated block-based motion vector refinement and subblock-based motion vector refinement, the DMVR enabling condition may be different from the DMVR enabling condition described in the background above. For example:
  The enabling condition may not have a condition that the distances (i.e., POC difference) from both reference pictures to the current picture are same.
  The enabling condition may not have a condition to constrain the block size or block dimension.
  The enabling condition may not have a condition to constrain the block in merge mode.

Video encoder 200 and video decoder 300 may be configured to implement enabling restrictions. A restriction that the reference pictures of the two predictors should be at different directions relative to the current picture was described above. In this example, the restriction is applied depending on the MatchingFunctionLowLevel that is determined as described above.

When the value of MatchingFunctionLowLevel indicates that bilateral matching is applied to the current block, the restriction is not applied to the current block.

When the value of MatchingFunctionLowLevel indicates that template matching is applied to the current block, the restriction is applied to the current block. In another example, the restriction is applied to the current block independent of the value of MatchingFunctionLowLevel. In another example, the restriction is not applied to the current block.

An example of second predictor candidate list construction will now be discussed. This example proposes several restrictions to the candidates in the second predictor candidate list A general restriction will now be described. Before the second predictor candidate list is constructed, the reference list of the first predictor FirstPredictorRefList and the reference list of the second predictor SecondPredictorRefList may already be determined. Video encoder 200 and video decoder 300 may be configured to implement a restriction that each candidate in the second predictor candidate list should have a valid motion vector at SecondPredictorRefList.

When the enabling restriction described above is applied, the restriction may be applied that each candidate in the second predictor candidate list should have a valid motion vector that satisfies the enabling restriction.

In one example, it is proposed to not add artificial candidates to the second predictor candidate list. For example, zero motion vector candidate should not be added to the second predictor candidate list. For example, average motion vector candidate (e.g., pair-wise candidate of VVC or HEVC) should not be added to the second predictor candidate list.

Video encoder 200 and video decoder 300 may be configured to implement a matching function dependent restriction. When the value of MatchingFunctionHighLevel indicates that the current block could use either bilateral matching or template matching function, video decoder 300 may examine the candidates in the second candidate list to avoid that an identical candidate is selected by different matching functions.

In one example, the bilateral matching function may be prioritized. To implement the second candidate list for template matching function, video encoder 200 and video decoder 300 may be configured to do the following steps in order:
  Construct second predictor candidate list (bilateral matching candidate list) that satisfy the restrictions of bilateral matching function as introduced above.

Calculate the bilateral matching error for each candidate in bilateral matching candidate list.

Compare the bilateral matching error and store the first N candidates which has smaller matching error that others. Wherein, N is equal to the value of NumSecondPredCandLowLevel as discussed above with respect to candidate index of second predictor parameters for the first example.

Construct second predictor candidate list (template matching candidate list) that satisfy the restrictions of template matching function as introduced above. When a candidate is identical to the candidate that is stored in the above step, the candidate should not be added to the template matching candidate list.

In one example, the template matching function may be prioritized. To implement the second candidate list for bilateral matching function, video encoder 200 and video decoder 300 may be configured to implement the following steps in order:

Construct second predictor candidate list (template matching candidate list) that satisfy the restrictions of the template matching function as described above.

Calculate the template matching error for each candidate in template matching candidate list.

Compare the template matching error and store the first N candidates which has smaller matching error that others. Wherein, N is equal to the value of NumSecondPredCandLowLevel as described above.

Construct second predictor candidate list (bilateral matching candidate list) that satisfy the restrictions of the bilateral matching function as described above. When a candidate is identical to the candidate that is stored in the above step, the candidate should not be added to the bilateral matching candidate list.

Figure 12:
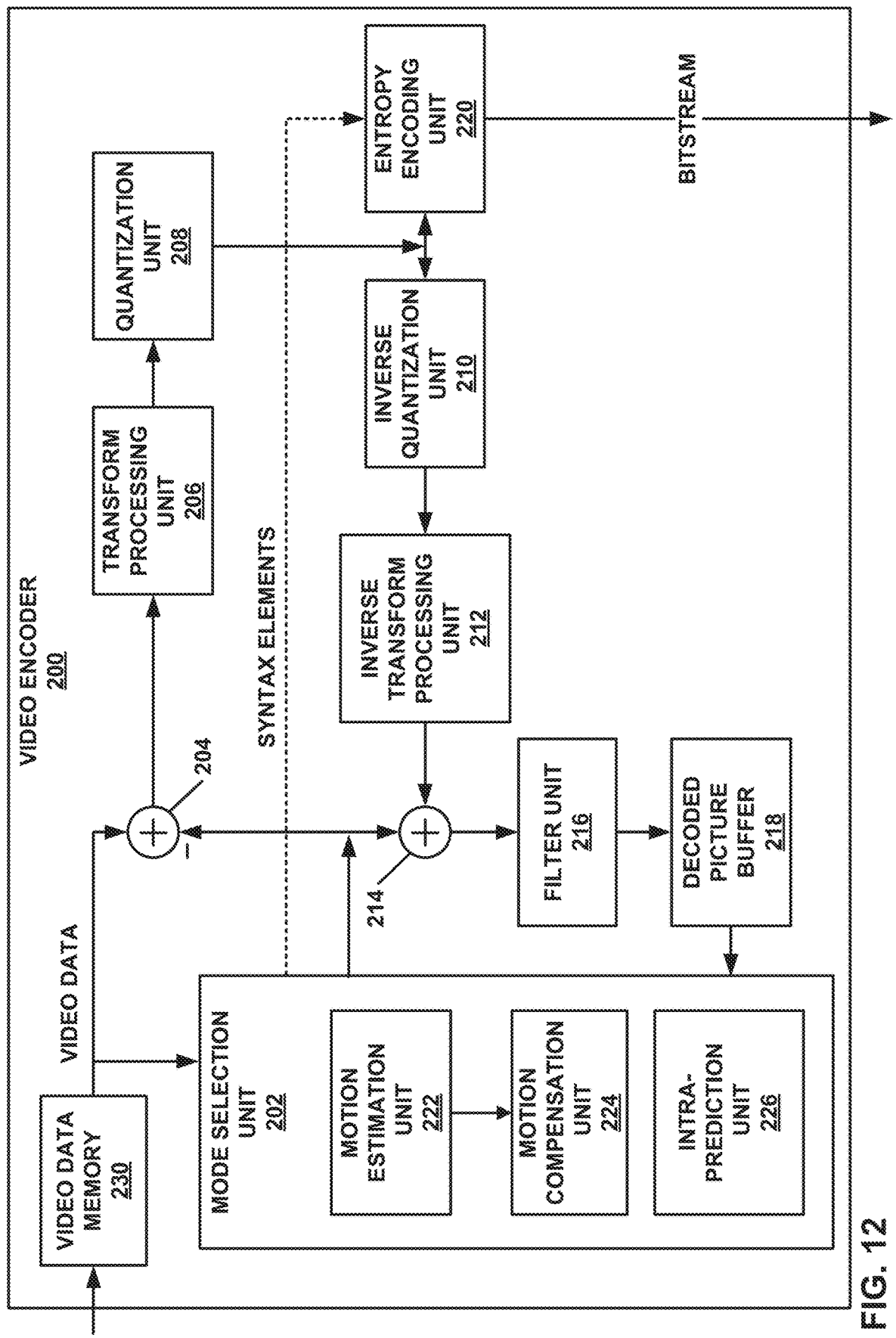
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to SAD, SSD, MAD, MSD, or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector and reference picture for a luma coding block need not be repeated for identifying a motion vector and reference picture for the chroma blocks. Rather, the motion vector for the luma coding block may be scaled to determine the motion vector for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform hybrid inter bi-prediction according to the techniques described herein.

Figure 13:
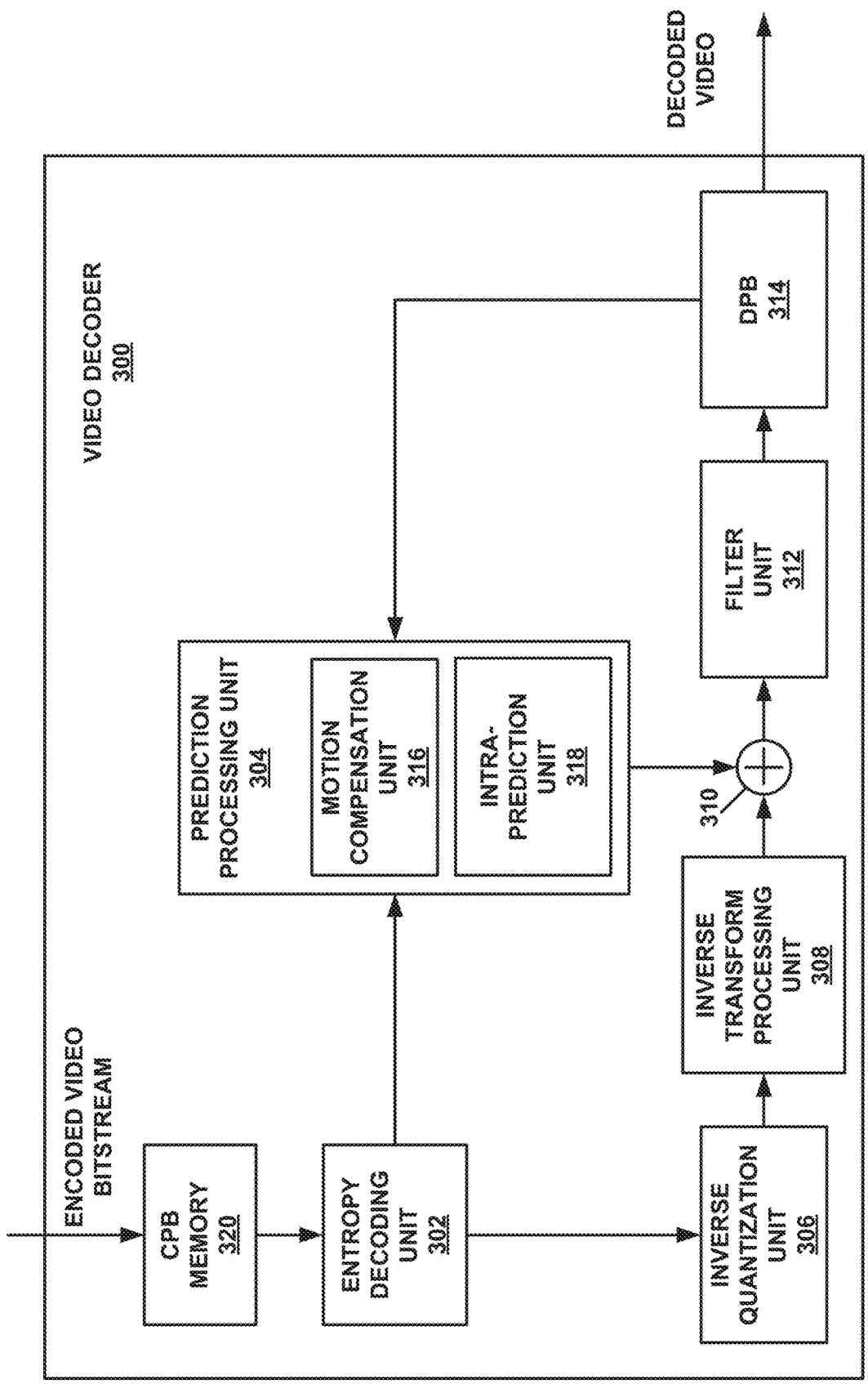
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

In accordance with the techniques of this disclosure, motion compensation unit 316 may be configured to predict a current block using hybrid inter bi-prediction by determining a first motion vector from syntax elements signaled in the bitstream of video data and determine a second motion vector with bilateral matching and without explicit signaling.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform hybrid inter bi-prediction according to the techniques described herein.

Figure 14:
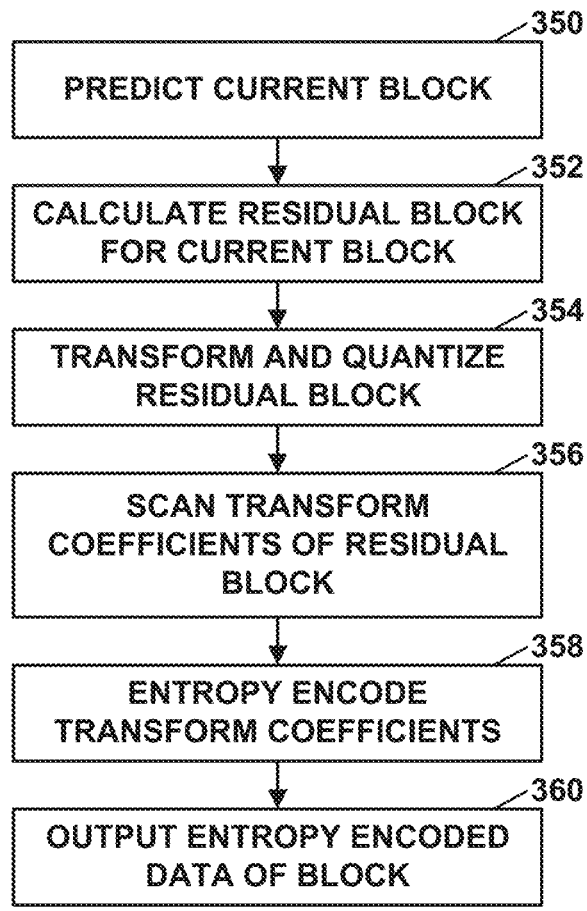
FIG. 14 is a flowchart illustrating an example process for encoding a current block in accordance with the techniques of this disclosure.

FIG. 14 is a flowchart illustrating an example process for encoding a current block in accordance with the techniques of this disclosure. The current block may comprise a current CU. Although described with respect to video encoder 200 (FIGS. 1 and 12), it should be understood that other devices may be configured to perform a process similar to that of FIG. 14.

In this example, video encoder 200 initially predicts the current block (350). For example, video encoder 200 may form a prediction block for the current block. In some instances, video encoder 200 may predict the current block using hybrid inter bi-prediction as described herein. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 15:
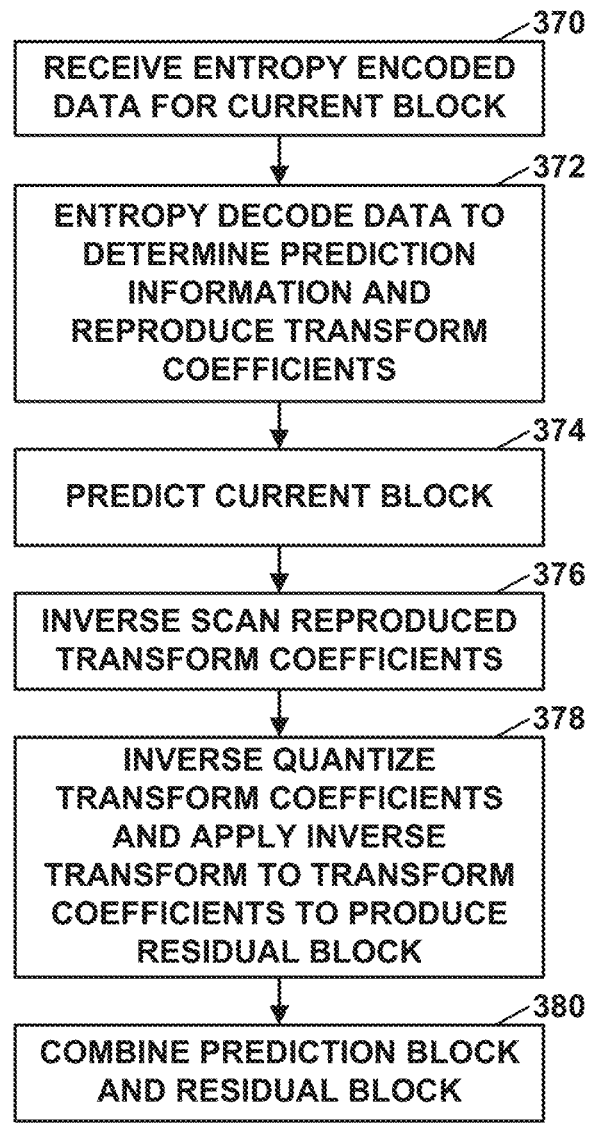
FIG. 15 is a flowchart illustrating an example process for decoding a current block in accordance with the techniques of this disclosure.

FIG. 15 is a flowchart illustrating an example process for decoding a current block of video data in accordance with the techniques of this disclosure. The current block may comprise a current CU. Although described with respect to video decoder 300 (FIGS. 1 and 13), it should be understood that other devices may be configured to perform a process similar to that of FIG. 15.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. In some instances, video decoder 300 may predict the current block using hybrid inter bi-prediction as described herein. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 16:
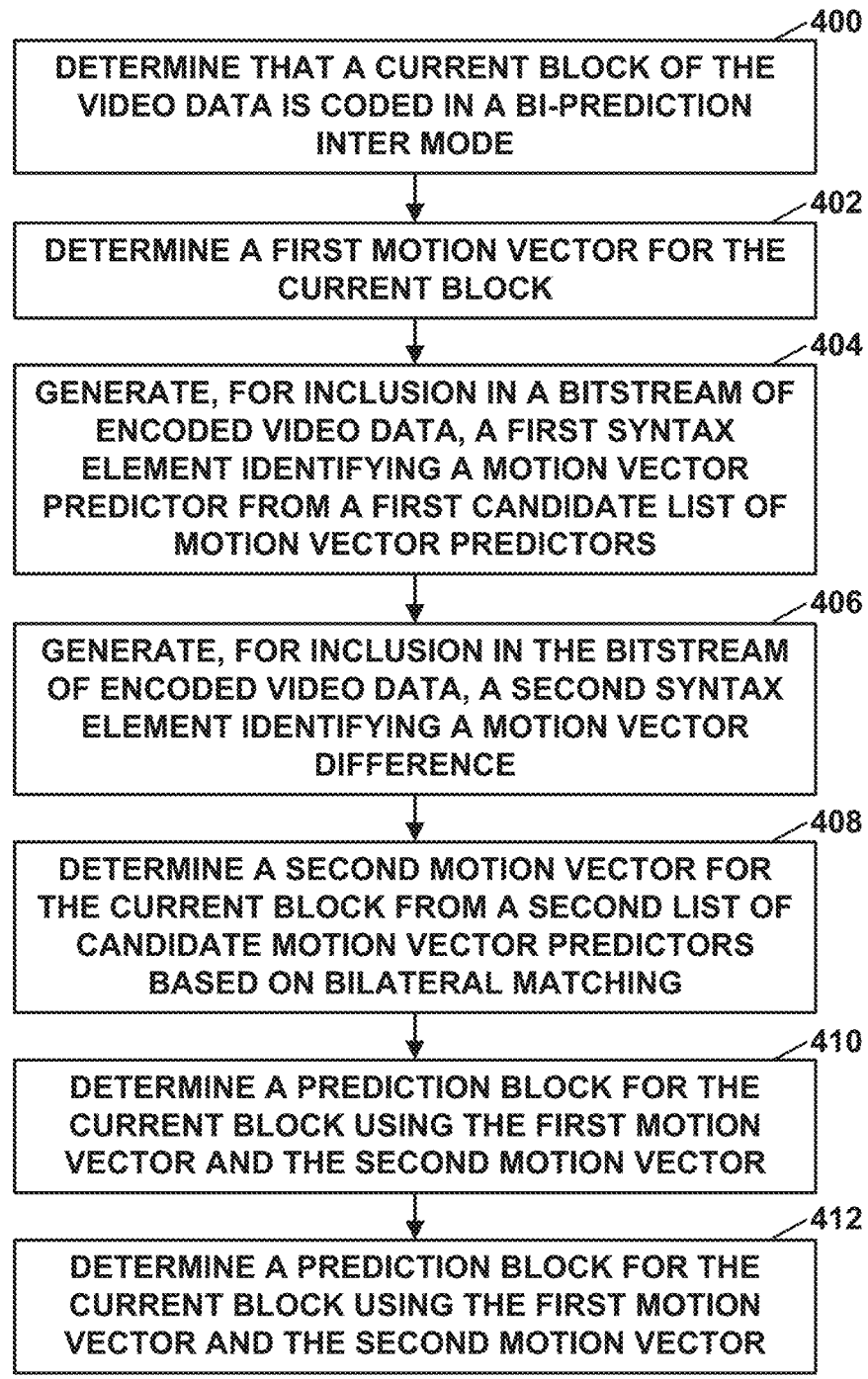
FIG. 16 is a flowchart illustrating an example process for encoding a current block in accordance with the techniques of this disclosure.

FIG. 16 is a flowchart illustrating an example process for encoding a current block in accordance with the techniques of this disclosure. The current block may, for example, be a current CU. Although described with respect to video encoder 200 (FIGS. 1 and 12), it should be understood that other devices may be configured to perform a process similar to that of FIG. 16.

Video encoder 200 determines that a current block of the video data is coded in a bi-prediction inter mode (400) and determines a first motion vector for the current block (402). To signal the first motion vector, video encoder 200 generates, for inclusion in a bitstream of encoded video data, a first syntax element identifying an MVP from a first candidate list of MVPs (404). The candidate list may, for example, be an AMVP candidate list as described above or may be some other type of candidate list. Video encoder 200 generates, for inclusion in the bitstream of encoded video data, a second syntax element identifying a MVD (406). The MVP and the MVD correspond to the first motion vector. For example, the MVD added to the MVP may be equal to the first motion vector.

Video encoder 200 determines a second motion vector for the current block from a second list of candidate MVPs based on bilateral matching (408). To determine the second motion vector for the current block from the second list of candidate MVPs based on the bilateral matching, video encoder 200 may be configured to locate a first reference block in a first reference picture using the first motion vector, locate, for each of a plurality of candidates in the second list of candidate motion vector predictors, a second reference block in a second reference picture using a respective motion vector of the respective candidate, and determine a bilateral matching error between the first reference block and the second reference block.

To determine the second motion vector for the current block from the second list of candidate MVPs based on the bilateral matching, video encoder 200 may be configured to locate a first reference block in a first reference picture using the first motion vector, determine a bilateral matching cost error between the first reference block and a second reference block located with a respective motion vector of each respective candidate. Video encoder 200 may then identify a candidate from the plurality of candidates that has a minimum bilateral matching error and derive the second motion vector from the motion vector of the identified candidate.

The second motion vector be the same as the motion vector of the identified candidate, or video encoder 200 may further refine the motion vector of the identified candidate to determine the second motion vector. For example, to derive the second motion vector from the motion vector of the identified candidate, video encoder 200 may be configured to perform bilateral matching motion vector refinement as described above or perform other types of decoder-side motion vector refinement. To perform bilateral matching motion vector refinement, video encoder 200 may be configured to identify an initial second reference block using the motion vector of the identified candidate, search within a search range around the initial second reference block for a final second reference block that produces a lower bilateral matching error with respect to the first reference block than does the initial second reference block, and determine the second motion vector based on the final second reference block.

Video encoder 200 determines a prediction block for the current block using the first motion vector and the second motion vector (410). Video encoder 200 may, for example, form a prediction block by averaging, possibly with weighting, the first reference block and the second reference block.

Video encoder 200 encodes the current block of video data based on the prediction block (412). To encode the current block of video data based on the prediction block, video encoder 200 may generate the bitstream of encoded video data without including in the bitstream of encoded video data explicit signaling identifying a candidate in the second list of candidate motion vector predictors.

Video encoder 200 may be configured to determine, based on a coding mode of the current block, whether the second motion vector is determined for the current block from the second list of candidate MVPs based on the bilateral matching or the second motion vector is determined for the current block using explicit signaling. Video encoder 200 may be configured to generate, for inclusion in the bitstream of encoded video data, a third syntax element and set the third syntax element to a first value. A first value for the third syntax element indicates that the second motion vector is determined for the current block from the second list of candidate MVPs based on the bilateral matching, and a second value of the third syntax element indicates that the second motion vector is determined for the current block using explicit signaling. Video encoder 200 may determine whether bi-prediction is enabled for a slice containing the current block and generate, for inclusion in the bitstream of encoded video data, the third syntax element in response to determining that the bi-prediction is enabled for a slice containing the current block.

Figure 17:
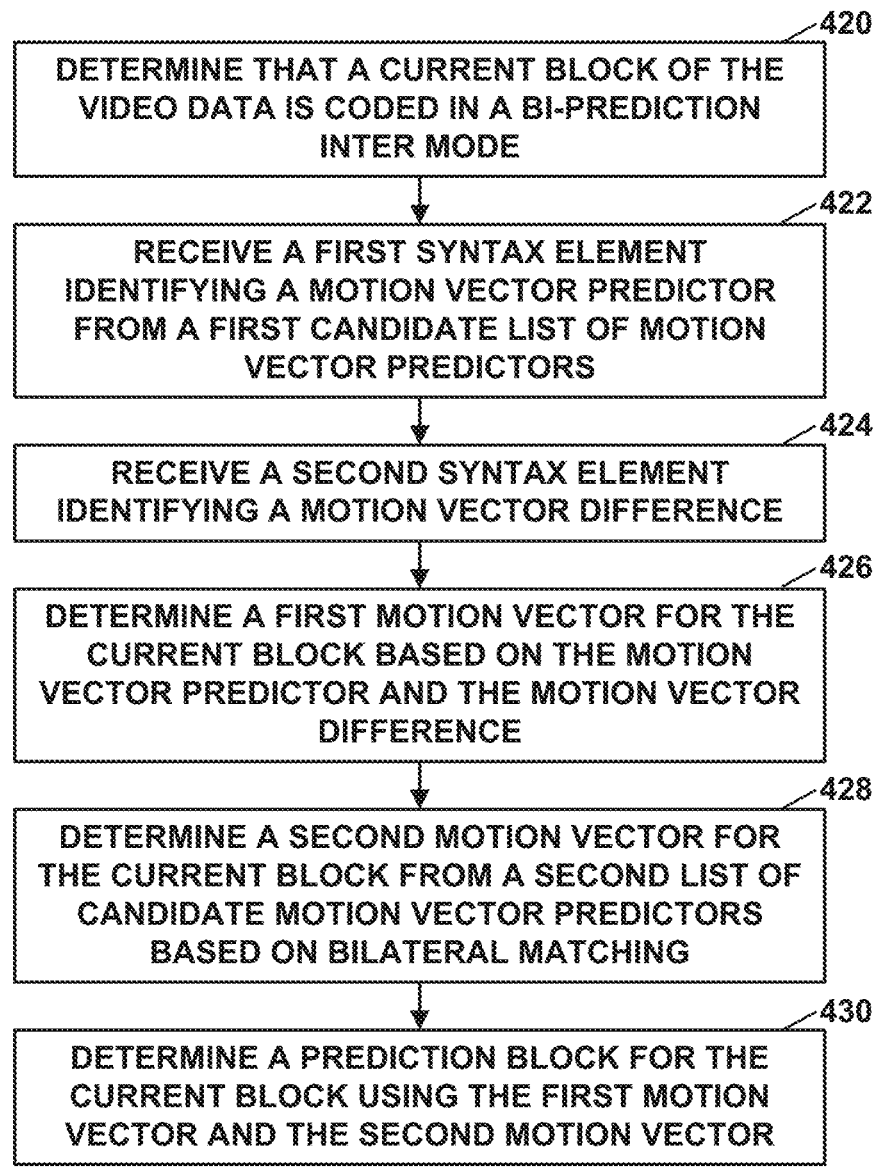
FIG. 17 is a flowchart illustrating an example process for decoding a current block in accordance with the techniques of this disclosure.

FIG. 17 is a flowchart illustrating an example process for decoding a current block of video data in accordance with the techniques of this disclosure. The current block may, for example, be a current CU. Although described with respect to video decoder 300 (FIGS. 1 and 13), it should be understood that other devices may be configured to perform a process similar to that of FIG. 17.

Video decoder 300 determines that a current block of the video data is coded in a bi-prediction inter mode (420). Video decoder 300 receives a first syntax element identifying an MVP from a first candidate list of MVPs (422) and receives a second syntax element identifying an MVD (424). The first candidate list may, for example, be an AMVP candidate list as described above or may be some other type of candidate list. Video decoder 300 determines a first motion vector for the current block based on the MVP and the MVD (426).

Video decoder 300 determines a second motion vector for the current block from a second list of candidate MVPs based on bilateral matching (428). Video decoder 300 may be configured to determine the second motion vector without explicit signaling identifying a candidate in the second list of candidate motion vector predictors. To determine the second motion vector for the current block from the second list of candidate MVPs based on the bilateral matching, video decoder 300 may be configured to locate a first reference block in a first reference picture using the first motion vector, locate, for each of a plurality of candidates in the second list of candidate motion vector predictors, a second reference block in a second reference picture using a respective motion vector of the respective candidate, and determine a bilateral matching error between the first reference block and the second reference block. The first reference picture may, for example, be from a first reference picture list.

Video decoder 300 determines a prediction block for the current block using the first motion vector and the second motion vector (430). As described in more detail with respect to FIGS. 13 and 15, video decoder 300 may, for example, add the prediction block to a residual block to form a reconstructed block. Video decoder 300 may apply one or more filters to the reconstructed block and output, for storage and/or display, the filtered reconstructed block as part of a decoded picture of video data.

To determine the second motion vector for the current block from the second list of candidate MVPs based on the bilateral matching, video decoder 300 may be configured to locate a first reference block in a first reference picture using the first motion vector and for each of a plurality of candidates in the second list of candidate motion vector predictors, determine a bilateral matching cost error between the first reference block and a second reference block located with a respective motion vector of each respective candidate. The first reference picture may be from a first reference picture list, and the second reference picture may be from a second reference picture list. Video decoder 300 may identify a candidate from the plurality of candidates that has a minimum bilateral matching error and derive the second motion vector from the motion vector of the identified candidate.

The second motion vector may be the same as the motion vector of the identified candidate, or video encoder 200 may further refine the motion vector of the identified candidate to determine the second motion vector. For example, to derive the second motion vector from the motion vector of the identified candidate, video decoder 300 may be configured to perform bilateral matching motion vector refinement as described above or perform other types of decoder-side motion vector refinement. To perform bilateral matching motion vector refinement, video decoder 300 may be configured to identify an initial second reference block using the motion vector of the identified candidate, search within a search range around the initial second reference block for a final second reference block that produces a lower bilateral matching error with respect to the first reference block than does the initial second reference block, an determine the second motion vector based on the final second reference block.

Video decoder 300 may be configured to determine, based on a coding mode of the current block, whether the second motion vector is determined for the current block from the second list of candidate MVPs based on the bilateral matching or the second motion vector is determined for the current block using explicit signaling. Video decoder 300 may determine whether bi-prediction is enabled for a slice containing the current block and receive the third syntax element in response to determining that the bi-prediction is enabled for a slice containing the current block.

Video decoder 300 may be configured to receive a third syntax element that is set to a first value. A first value for the third syntax element indicates that the second motion vector is determined for the current block from the second list of candidate MVPs based on the bilateral matching, and a second value of the third syntax element indicates that the second motion vector is determined for the current block using explicit signaling.

The following numbered clauses illustrate one or more aspects of the devices and techniques described in this disclosure.

Clause 1A. A method of coding video data, the method comprising: determining that a current block of the video data is coded in a bi-prediction inter mode; determining a first motion vector for the current block based on a motion vector predictor and a motion vector difference; determining a second motion vector for the current block from a list of candidate motion vectors; and determining a prediction block for the current block using the first motion vector and the second motion vector.

Clause 2A. The method of clause 1A, wherein determining the second motion vector for the current block from the list of candidate motion vectors comprises determining the second motion vector without explicit signaling identifying a candidate in the list of candidate motion vectors.

Clause 3A. The method of clause 1A or 2A, further comprising: receiving a first syntax element identifying the motion vector predictor; and receiving a second syntax element defining the motion vector difference.

Clause 4A. The method of clause 3A, wherein receiving the second syntax element defining the motion vector difference comprises: receiving the second syntax element defining the motion vector difference in response to determining that one or more conditions are true, the one or more conditions including at least one of: a value of the first syntax element being equal to a first value, or a reference picture index being equal to a second value.

Clause 5A. The method of any of clauses 1A-4A, wherein determining the second motion vector for the current block from the list of candidate motion vectors comprises selecting a candidate from the list of candidate motion vectors based on bilateral matching.

Clause 6A. The method of clauses 1A, 3A, 4A, and 5A, clauses 1A, 3A, and 5A, or clauses 1A and 5A, further comprising: receiving a third syntax element; selecting the candidate from the list of candidate motion vectors based on a value of the third syntax element and the bilateral matching.

Clause 7A. The method of any of clauses 1A-6A, wherein determining the second motion vector for the current block from the list of candidate motion vectors comprises selecting a candidate from the list of candidate motion vectors based on template matching.

Clause 8A. The method of any of clauses 1A-7A, further comprising: performing merge list padding to generate the list of candidate motion vectors.

Clause 9A. The method of any of clauses 1A-8A, wherein coding comprises decoding.

Clause 10A. The method of any of clauses 1A-8A, wherein coding comprises encoding.

Clause 11A. A device for coding video data, the device comprising one or more means for performing the method of any of clauses 1A-10A.

Clause 12A. The device of clause 11A, wherein the one or more means comprise one or more processors implemented in circuitry.

Clause 13A. The device of any of clauses 11A and 12A, further comprising a memory to store the video data.

Clause 14A. The device of any of clauses 11A-13A, further comprising a display configured to display decoded video data.

Clause 15A. The device of any of clauses 11A-14A, wherein the device comprises one or more of a camera, a computer, a mobile device, a broadcast receiver device, or a set-top box.

Clause 16A. The device of any of clauses 11A-15A, wherein the device comprises a video decoder.

Clause 17A. The device of any of clauses 11A-16A, wherein the device comprises a video encoder.

Clause 18A. A computer-readable storage medium having stored thereon instructions that, when executed, cause one or more processors to perform the method of any of clauses 1A-10A.

Clause 1B. A method of coding video data, the method comprising: deriving a first predictor for a hybrid inter bi-prediction process; deriving a second predictor for the hybrid inter bi-prediction process based on a high-level parameter and a low-level parameter; and coding a block of video data using the hybrid inter-prediction process according to the first predictor and the second predictor.

Clause 2B. The method of Clause 1B, wherein the high-level parameter is used for one or more of a video sequence, a picture set of a video sequence, a picture, a slice, a subpicture, a tile, a CTU, or a predetermined region.

Clause 3B. The method of Clause 1B, wherein the low-level parameter is used for the block, including one or more of coding unit or a prediction unit.

Clause 4B. The method of Clause 1B, wherein one or more of the high-level parameter or the low-level parameter indicate a matching function used to derive the second predictor.

Clause 5B. The method of Clause 1B, wherein the high-level parameter indicates a maximum number of candidates from a candidate list.

Clause 6B. The method of Clause 5B, wherein the second low-level parameter indicates a candidate in the candidate list to use to derive the second predictor.

Clause 7B. The method of Clause 1B, wherein a value of the low-level parameter indicates that a bilateral matching function is used to derive the second predictor, the method further comprising: refining a motion vector of the second predictor, including minimizing a bilateral matching error.

Clause 8B. The method of Clause 1B, wherein a value of the low-level parameter indicates that a template matching function is used to derive the second predictor, the method further comprising: refining a motion vector of the second predictor, including minimizing a template matching error.

Clause 9B. The method of Clause 1B, further comprising: refining a motion vector of the second predictor using a block-based motion vector refinement process.

Clause 10B. The method of Clause 1B, further comprising: refining a motion vector of the second predictor using a subblock-based motion vector refinement process.

Clause 11B. The method of Clause 1B, further comprising: determining an enabling condition for the hybrid inter bi-prediction process based on a value of the low-level parameter.

Clause 12B. The method of any of Clauses 1B-11B, wherein coding comprises encoding.

Clause 13B. A device for coding video data, the device comprising one or more means for performing the method of any of Clauses 1B-12B.

Clause 14B. The device of Clause 13B, wherein the one or more means comprise one or more processors implemented in circuitry.

Clause 15B. The device of any of Clauses 13B and 14B, further comprising a memory to store the video data.

Clause 16B. The device of any of Clauses 13B-15B, further comprising a display configured to display decoded video data.

Clause 17B. The device of any of Clauses 13B-16B, wherein the device comprises one or more of a camera, a computer, a mobile device, a broadcast receiver device, or a set-top box.

Clause 18B. The device of any of Clauses 13B-17B, wherein the device comprises a video decoder.

Clause 19B. The device of any of Clauses 13B-18B, wherein the device comprises a video encoder.

Clause 20B. A computer-readable storage medium having stored thereon instructions that, when executed, cause one or more processors to perform the method of any of Clauses 1B-12B.

Clause 21B. A method of coding video data, the method comprising: deriving a first predictor for a hybrid inter bi-prediction process; deriving a second predictor for the hybrid inter bi-prediction process based on a high-level parameter and a low-level parameter; and coding a block of video data using the hybrid inter-prediction process according to the first predictor and the second predictor.

Clause 22B. The method of Clause 21B, wherein the high-level parameter is used for one or more of a video sequence, a picture set of a video sequence, a picture, a slice, a subpicture, a tile, a CTU, or a predetermined region.

Clause 23B. The method of any of Clauses 21B-22B, wherein the low-level parameter is used for the block, including one or more of coding unit or a prediction unit.

Clause 24B. The method of any of Clauses 21B-23B, wherein one or more of the high-level parameter or the low-level parameter indicate a matching function used to derive the second predictor.

Clause 25B. The method of any of Clauses 21B-23B, wherein the high-level parameter indicates a maximum number of candidates from a candidate list.

Clause 26B. The method of Clause 25B, wherein the second low-level parameter indicates a candidate in the candidate list to use to derive the second predictor.

Clause 27B. The method of any of Clauses 21B-26B, wherein a value of the low-level parameter indicates that a bilateral matching function is used to derive the second predictor, the method further comprising: refining a motion vector of the second predictor, including minimizing a bilateral matching error.

Clause 28B. The method of any of Clauses 21B-27B, wherein a value of the low-level parameter indicates that a template matching function is used to derive the second predictor, the method further comprising: refining a motion vector of the second predictor, including minimizing a template matching error.

Clause 29B. The method of any of Clauses 21B-28B, further comprising: refining a motion vector of the second predictor using a block-based motion vector refinement process.

Clause 30B. The method of any of Clauses 21B-29B, further comprising: refining a motion vector of the second predictor using a subblock-based motion vector refinement process.

Clause 31B. The method of any of Clauses 21B-30B, further comprising: determining an enabling condition for the hybrid inter bi-prediction process based on a value of the low-level parameter.

Clause 1C. A method of decoding video data, the method comprising: determining that a current block of the video data is coded in a bi-prediction inter mode;

receiving a first syntax element identifying a motion vector predictor from a first candidate list of motion vector predictors; receiving a second syntax element identifying a motion vector difference; determining a first motion vector for the current block based on the motion vector predictor and the motion vector difference; determining a second motion vector for the current block from a second list of candidate motion vector predictors based on bilateral matching; and determining a prediction block for the current block using the first motion vector and the second motion vector.

Clause 2C. The method of clause 1C, wherein determining the second motion vector for the current block from the second list of candidate motion vector predictors comprises determining the second motion vector without receiving explicit signaling identifying a candidate in the second list of candidate motion vector predictors.

Clause 3C. The method of clause 1C, wherein determining the second motion vector for the current block from the second list of candidate motion vector predictors based on the bilateral matching comprises: locating a first reference block in a first reference picture using the first motion vector, wherein the first reference picture is from a first reference picture list; for each of a plurality of candidates in the second list of candidate motion vector predictors, locating a second reference block in a second reference picture using a respective motion vector of the respective candidate, wherein the second reference picture is from a second reference picture list; and determining a bilateral matching error between the first reference block and the second reference block.

Clause 4C. The method of clause 1C, wherein determining the second motion vector for the current block from the second list of candidate motion vector predictors based on the bilateral matching comprises: locating a first reference block in a first reference picture using the first motion vector; for each of a plurality of candidates in the second list of candidate motion vector predictors, determining a bilateral matching cost error between the first reference block and a second reference block located with a respective motion vector of each respective candidate; identifying a candidate from the plurality of candidates that has a minimum bilateral matching error; and deriving the second motion vector from the motion vector of the candidate from the plurality of candidates that has the minimum bilateral matching error.

Clause 5C. The method of clause 4C, wherein deriving the second motion vector from the motion vector of the candidate from the plurality of candidates that has the minimum bilateral matching error comprises performing bilateral matching motion vector refinement.

Clause 6C. The method of clause 5C, wherein performing bilateral matching motion vector refinement comprises: identifying an initial second reference block using the motion vector of the candidate from the plurality of candidates that has the minimum bilateral matching error; searching within a search range around the initial second reference block for a final second reference block that produces a lower bilateral matching error with respect to the first reference block than does the initial second reference block; and determining the second motion vector based on the final second reference block.

Clause 7C. The method of clause 1C, further comprising: determining, based on a coding mode of the current block, whether the second motion vector is determined for the current block from the second list of candidate motion vector predictors based on the bilateral matching or the second motion vector is determined for the current block using explicit signaling.

Clause 8C. The method of clause 1C, further comprising: receiving a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determining that the third syntax element is set to the first value.

Clause 9C. The method of clause 8C, further comprising: determining whether bi-prediction is enabled for a slice containing the current block; and receiving the third syntax element in response to determining that the bi-prediction is enabled for the slice containing the current block.

Clause 10C. A device for decoding video data, the device comprising: a memory configured to store video data; one or more processors implemented in circuitry and configured to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

Clause 11C. The device of clause 10C, wherein to determine the second motion vector for the current block from the second list of candidate motion vector predictors, the one or more processors are further configured to determine the second motion vector without receiving explicit signaling identifying a candidate in the second list of candidate motion vector predictors.

Clause 12C. The device of clause 10C, wherein to determine the second motion vector for the current block from the second list of candidate motion vector predictors based on the bilateral matching, the one or more processors are further configured to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 13C. The device of clause 10C, wherein to determine the second motion vector for the current block from the second list of candidate motion vector predictors based on the bilateral matching, the one or more processors are further configured to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 14C. The device of clause 13C, wherein to derive the second motion vector from the motion vector of the candidate from the plurality of candidates that has the minimum bilateral matching error, the one or more processors are further configured to perform bilateral matching motion vector refinement.

Clause 15C. The device of clause 14C, wherein to perform bilateral matching motion vector refinement, the one or more processors are further configured to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 16C. The device of clause 10C, wherein the one or more processors are further configured to: determine, based on a coding mode of the current block, whether the second motion vector is determined for the current block from the second list of candidate motion vector predictors based on the bilateral matching or the second motion vector is determined for the current block using explicit signaling.

Clause 17C. The device of clause 10C, wherein the one or more processors are further configured to: receive a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determine that the third syntax element is set to the first value.

Clause 18C. The device of clause 17C, wherein the one or more processors are further configured to: determine whether bi-prediction is enabled for a slice containing the current block; and receive the third syntax element in response to determining that the bi-prediction is enabled for the slice containing the current block.

Clause 19C. The device of clause 10C, wherein the device comprises a wireless communication device, further comprising a receiver configured to receive encoded video data.

Clause 20C. The device of clause 19C, wherein the wireless communication device comprises a telephone handset and wherein the receiver is configured to demodulate, according to a wireless communication standard, a signal comprising the encoded video data.

Clause 21C. The device of clause 10C, further comprising: a display configured to display decoded video data.

Clause 22C. The device of clause 10C, wherein the device comprises one or more of a camera, a computer, a mobile device, a broadcast receiver device, or a set-top box.

Clause 23C. A device for encoding video data, the device comprising: a memory configured to store video data; one or more processors implemented in circuitry and configured to: determine that a current block of the video data is coded in a bi-prediction inter mode; determine a first motion vector for the current block; generate, for inclusion in a bitstream of encoded video data, a first syntax element identifying a motion vector predictor from a first candidate list of motion vector predictors; generate, for inclusion in the bitstream of encoded video data, a second syntax element identifying a motion vector difference, wherein the motion vector predictor and the motion vector difference correspond to the first motion vector; determine a second motion vector for the current block from a second list of candidate motion vector predictors based on bilateral matching; determine a prediction block for the current block using the first motion vector and the second motion vector; and encode the current block of video data based on the prediction block.

Clause 24C. The device of clause 23C, wherein to encode the current block of video data based on the prediction block, the one or more processors are further configured to generate the bitstream of encoded video data without including in the bitstream of encoded video data explicit signaling identifying a candidate in the second list of candidate motion vector predictors.

Clause 25C. The device of clause 23C, wherein to determine the second motion vector for the current block from the second list of candidate motion vector predictors based on the bilateral matching, the one or more processors are further configured to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 26C. The device of clause 23C, wherein to determine the second motion vector for the current block from the second list of candidate motion vector predictors based on the bilateral matching, the one or more processors are further configured to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 27C. The device of clause 26C, wherein to derive the second motion vector from the motion vector of the candidate from the plurality of candidates that has the minimum bilateral matching error, the one or more processors are further configured to perform bilateral matching motion vector refinement.

Clause 28C. The device of clause 27C, wherein to perform bilateral matching motion vector refinement, the one or more processors are further configured to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 29C. The device of clause 23C, wherein the one or more processors are further configured to: determine, based on a coding mode of the current block, whether the second motion vector is determined for the current block from the second list of candidate motion vector predictors based on the bilateral matching or the second motion vector is determined for the current block using explicit signaling.

Clause 30C. The device of clause 23C, wherein the one or more processors are further configured to: generate, for inclusion in the bitstream of encoded video data, a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and set the third syntax element to the first value.

Clause 31C. The device of clause 30C, wherein the one or more processors are further configured to: determine whether bi-prediction is enabled for a slice containing the current block; and generate, for inclusion in the bitstream of encoded video data, the third syntax element in response to determining that the bi-prediction is enabled for the slice containing the current block.

Clause 32C. The device of clause 23C, wherein the device comprises a wireless communication device, further comprising a transmitter configured to transmit encoded video data.

Clause 33C. The device of clause 32C, wherein the wireless communication device comprises a telephone handset and wherein the transmitter is configured to modulate, according to a wireless communication standard, a signal comprising the encoded video data.

Clause 34C. The device of clause 23C, further comprising: a camera configured to capture video data.

Clause 35C. The device of clause 23C, wherein the device comprises one or more of a camera, a computer, a mobile device, a broadcast receiver device, or a set-top box.

Clause 36C. A computer-readable storage medium storing instructions that when executed by one or more processors cause the one or more processors to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

Clause 37C. The computer-readable storage medium of clause 36C, wherein to determine the second motion vector for the current block from the second list of candidate motion vector predictors, the instructions cause the one or more processors to determine the second motion vector without receiving explicit signaling identifying a candidate in the second list of candidate motion vector predictors.

Clause 38C. The computer-readable storage medium of clause 36C, wherein to determine the second motion vector for the current block from the second list of candidate motion vector predictors based on the bilateral matching, the instructions cause the one or more processors to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 39C. The computer-readable storage medium of clause 36C, wherein to determine the second motion vector for the current block from the second list of candidate motion vector predictors based on the bilateral matching, the instructions cause the one or more processors to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 40C. The computer-readable storage medium of clause 39C, wherein to derive the second motion vector from the motion vector of the candidate from the plurality of candidates that has the minimum bilateral matching error, the instructions cause the one or more processors to perform bilateral matching motion vector refinement.

Clause 41C. The computer-readable storage medium of clause 40C, wherein to perform bilateral matching motion vector refinement, the instructions cause the one or more processors to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 42C. The computer-readable storage medium of clause 36C, storing further instructions that when executed cause the one or more processors to: determine, based on a coding mode of the current block, whether the second motion vector is determined for the current block from the second list of candidate motion vector predictors based on the bilateral matching or the second motion vector is determined for the current block using explicit signaling.

Clause 43C. The computer-readable storage medium of clause 36C, storing further instructions that when executed cause the one or more processors to: receive a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determine that the third syntax element is set to the first value.

Clause 44C. The computer-readable storage medium of clause 43C, storing further instructions that when executed cause the one or more processors to: determine whether bi-prediction is enabled for a slice containing the current block; and receive the third syntax element in response to determining that the bi-prediction is enabled for the slice containing the current block.

Clause 1D. A method of decoding video data, the method comprising: determining that a current block of the video data is coded in a bi-prediction inter mode; receiving a first syntax element identifying a motion vector predictor from a first candidate list of motion vector predictors; receiving a second syntax element identifying a motion vector difference; determining a first motion vector for the current block based on the motion vector predictor and the motion vector difference; determining a second motion vector for the current block from a second list of candidate motion vector predictors based on bilateral matching; and determining a prediction block for the current block using the first motion vector and the second motion vector.

Clause 2D. The method of clause 1D, wherein determining the second motion vector for the current block from the second list of candidate motion vector predictors comprises determining the second motion vector without receiving explicit signaling identifying a candidate in the second list of candidate motion vector predictors.

Clause 3D. The method of clause 1D or 2D, wherein determining the second motion vector for the current block from the second list of candidate motion vector predictors based on the bilateral matching comprises: locating a first reference block in a first reference picture using the first motion vector, wherein the first reference picture is from a first reference picture list; for each of a plurality of candidates in the second list of candidate motion vector predictors, locating a second reference block in a second reference picture using a respective motion vector of the respective candidate, wherein the second reference picture is from a second reference picture list; and determining a bilateral matching error between the first reference block and the second reference block.

Clause 4D. The method of clause 1D or 2D, wherein determining the second motion vector for the current block from the second list of candidate motion vector predictors based on the bilateral matching comprises: locating a first reference block in a first reference picture using the first motion vector; for each of a plurality of candidates in the second list of candidate motion vector predictors, determining a bilateral matching cost error between the first reference block and a second reference block located with a respective motion vector of each respective candidate; identifying a candidate from the plurality of candidates that has a minimum bilateral matching error; and deriving the second motion vector from the motion vector of the candidate from the plurality of candidates that has the minimum bilateral matching error.

Clause 5D. The method of clause 4D, wherein deriving the second motion vector from the motion vector of the candidate from the plurality of candidates that has the minimum bilateral matching error comprises performing bilateral matching motion vector refinement.

Clause 6D. The method of clause 5D, wherein performing bilateral matching motion vector refinement comprises: identifying an initial second reference block using the motion vector of the candidate from the plurality of candidates that has the minimum bilateral matching error; searching within a search range around the initial second reference block for a final second reference block that produces a lower bilateral matching error with respect to the first reference block than does the initial second reference block; and determining the second motion vector based on the final second reference block.

Clause 7D. The method of any of clause 1D-6D, further comprising: determining, based on a coding mode of the current block, whether the second motion vector is determined for the current block from the second list of candidate motion vector predictors based on the bilateral matching or the second motion vector is determined for the current block using explicit signaling.

Clause 8D. The method of any of clauses 1D-7D, further comprising: receiving a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determining that the third syntax element is set to the first value.

Clause 9D. The method of clause 8D, further comprising: determining whether bi-prediction is enabled for a slice containing the current block; and receiving the third syntax element in response to determining that the bi-prediction is enabled for the slice containing the current block.

Clause 10D. A device for decoding video data, the device comprising: a memory configured to store video data; and one or more processors implemented in circuitry and configured to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

Clause 11D. The device of clause 10D, wherein to determine the second motion vector for the current block from the second list of candidate motion vector predictors, the one or more processors are further configured to determine the second motion vector without receiving explicit signaling identifying a candidate in the second list of candidate motion vector predictors.

Clause 12D. The device of clause 10D or 11D, wherein to determine the second motion vector for the current block from the second list of candidate motion vector predictors based on the bilateral matching, the one or more processors are further configured to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 13D. The device of clause 10D or 11D, wherein to determine the second motion vector for the current block from the second list of candidate motion vector predictors based on the bilateral matching, the one or more processors are further configured to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 14D. The device of clause 13D, wherein to derive the second motion vector from the motion vector of the candidate from the plurality of candidates that has the minimum bilateral matching error, the one or more processors are further configured to perform bilateral matching motion vector refinement.

Clause 15D. The device of clause 14D, wherein to perform bilateral matching motion vector refinement, the one or more processors are further configured to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 16D. The device of any of clauses 10D-15D, wherein the one or more processors are further configured to: determine, based on a coding mode of the current block, whether the second motion vector is determined for the current block from the second list of candidate motion vector predictors based on the bilateral matching or the second motion vector is determined for the current block using explicit signaling.

Clause 17D. The device of any of clauses 10D-16D, wherein the one or more processors are further configured to: receive a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determine that the third syntax element is set to the first value.

Clause 18D. The device of clause 17D, wherein the one or more processors are further configured to: determine whether bi-prediction is enabled for a slice containing the current block; and receive the third syntax element in response to determining that the bi-prediction is enabled for the slice containing the current block.

Clause 19D. The device of any of clauses 10D-18D, wherein the device comprises a wireless communication device, further comprising a receiver configured to receive encoded video data.

Clause 20D. The device of clause 19D, wherein the wireless communication device comprises a telephone handset and wherein the receiver is configured to demodulate, according to a wireless communication standard, a signal comprising the encoded video data.

Clause 21D. The device of any of clauses 10D-20D, further comprising: a display configured to display decoded video data.

Clause 22D. The device of any of clauses 10D-21D, wherein the device comprises one or more of a camera, a computer, a mobile device, a broadcast receiver device, or a set-top box.

Clause 23D. A device for encoding video data, the device comprising: a memory configured to store video data; and one or more processors implemented in circuitry and configured to: determine that a current block of the video data is coded in a bi-prediction inter mode; determine a first motion vector for the current block; generate, for inclusion in a bitstream of encoded video data, a first syntax element identifying a motion vector predictor from a first candidate list of motion vector predictors; generate, for inclusion in the bitstream of encoded video data, a second syntax element identifying a motion vector difference, wherein the motion vector predictor and the motion vector difference correspond to the first motion vector; determine a second motion vector for the current block from a second list of candidate motion vector predictors based on bilateral matching; determine a prediction block for the current block using the first motion vector and the second motion vector; and encode the current block of video data based on the prediction block.

Clause 24D. The device of clause 23D, wherein to encode the current block of video data based on the prediction block, the one or more processors are further configured to generate the bitstream of encoded video data without including in the bitstream of encoded video data explicit signaling identifying a candidate in the second list of candidate motion vector predictors.

Clause 25D. The device of clause 23D or 24D, wherein to determine the second motion vector for the current block from the second list of candidate motion vector predictors based on the bilateral matching, the one or more processors are further configured to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 26D. The device of clause 23D or 24D, wherein to determine the second motion vector for the current block from the second list of candidate motion vector predictors based on the bilateral matching, the one or more processors are further configured to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 27D. The device of clause 26D, wherein to derive the second motion vector from the motion vector of the candidate from the plurality of candidates that has the minimum bilateral matching error, the one or more processors are further configured to perform bilateral matching motion vector refinement.

Clause 28D. The device of clause 27D, wherein to perform bilateral matching motion vector refinement, the one or more processors are further configured to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 29D. The device of any of clauses 23D-28D, wherein the one or more processors are further configured to: determine, based on a coding mode of the current block, whether the second motion vector is determined for the current block from the second list of candidate motion vector predictors based on the bilateral matching or the second motion vector is determined for the current block using explicit signaling.

Clause 30D. The device of any of clauses 23D-29D, wherein the one or more processors are further configured to: generate, for inclusion in the bitstream of encoded video data, a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and set the third syntax element to the first value.

Clause 31D. The device of clause 30D, wherein the one or more processors are further configured to: determine whether bi-prediction is enabled for a slice containing the current block; and generate, for inclusion in the bitstream of encoded video data, the third syntax element in response to determining that the bi-prediction is enabled for the slice containing the current block.

Clause 32D. The device of any of clauses 23D-31D, wherein the device comprises a wireless communication device, further comprising a transmitter configured to transmit encoded video data.

Clause 33D. The device of clause 32D, wherein the wireless communication device comprises a telephone handset and wherein the transmitter is configured to modulate, according to a wireless communication standard, a signal comprising the encoded video data.

Clause 34D. The device of any of clauses 23D-33D, further comprising: a camera configured to capture video data.

Clause 35D. The device of any of clauses 23D-34D, wherein the device comprises one or more of a camera, a computer, a mobile device, a broadcast receiver device, or a set-top box.

Clause 36D. A computer-readable storage medium storing instructions that when executed by one or more processors cause the one or more processors to: determine that a current block of the video data is coded in a bi-prediction inter mode; receive a first syntax element identifying a motion vector predictor from a first candidate list of motion vector predictors; receive a second syntax element identifying a motion vector difference; determine a first motion vector for the current block based on the motion vector predictor and the motion vector difference; determine a second motion vector for the current block from a second list of candidate motion vector predictors based on bilateral matching; and determine a prediction block for the current block using the first motion vector and the second motion vector.

Clause 37D. The computer-readable storage medium of clause 36D, wherein to determine the second motion vector for the current block from the second list of candidate motion vector predictors, the instructions cause the one or more processors to determine the second motion vector without receiving explicit signaling identifying a candidate in the second list of candidate motion vector predictors.

Clause 38D. The computer-readable storage medium of clause 36D or 37D, wherein to determine the second motion vector for the current block from the second list of candidate motion vector predictors based on the bilateral matching, the instructions cause the one or more processors to: locate a first reference block in a first reference picture using the first motion vector, wherein the first reference picture is from a first reference picture list; for each of a plurality of candidates in the second list of candidate motion vector predictors, locate a second reference block in a second reference picture using a respective motion vector of the respective candidate, wherein the second reference picture is from a second reference picture list; and determine a bilateral matching error between the first reference block and the second reference block.

Clause 39D. The computer-readable storage medium of clause 36D or 37D, wherein to determine the second motion vector for the current block from the second list of candidate motion vector predictors based on the bilateral matching, the instructions cause the one or more processors to: locate a first reference block in a first reference picture using the first motion vector; for each of a plurality of candidates in the second list of candidate motion vector predictors, determine a bilateral matching cost error between the first reference block and a second reference block located with a respective motion vector of each respective candidate; identify a candidate from the plurality of candidates that has a minimum bilateral matching error; and derive the second motion vector from the motion vector of the candidate from the plurality of candidates that has the minimum bilateral matching error.

Clause 40D. The computer-readable storage medium of clause 39D, wherein to derive the second motion vector from the motion vector of the candidate from the plurality of candidates that has the minimum bilateral matching error, the instructions cause the one or more processors to perform bilateral matching motion vector refinement.

Clause 41D. The computer-readable storage medium of clause 40D, wherein to perform bilateral matching motion vector refinement, the instructions cause the one or more processors to: identify an initial second reference block using the motion vector of the candidate from the plurality of candidates that has the minimum bilateral matching error; search within a search range around the initial second reference block for a final second reference block that produces a lower bilateral matching error with respect to the first reference block than does the initial second reference block; and determine the second motion vector based on the final second reference block.

Clause 42D. The computer-readable storage medium of any of clauses 36D-41D, storing further instructions that when executed cause the one or more processors to: determine, based on a coding mode of the current block, whether the second motion vector is determined for the current block from the second list of candidate motion vector predictors based on the bilateral matching or the second motion vector is determined for the current block using explicit signaling.

Clause 43D. The computer-readable storage medium of any of clauses 36D-42D, storing further instructions that when executed cause the one or more processors to: receive a third syntax element, wherein a first value for the third syntax element indicates that the second motion vector is determined for the current block from the second list of candidate motion vector predictors based on the bilateral matching, and a second value of the third syntax element indicates that the second motion vector is determined for the current block using explicit signaling; and determine that the third syntax element is set to the first value.

Clause 44D. The computer-readable storage medium of clause 43D, storing further instructions that when executed cause the one or more processors to: determine whether bi-prediction is enabled for a slice containing the current block; and receive the third syntax element in response to determining that the bi-prediction is enabled for the slice containing the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a current block of the video data is coded in a bi-prediction inter mode;
   receiving a first syntax element, wherein the first syntax element comprises a flag with one of only two values, wherein a first value of the two values indicates that a first motion vector for a bi-predicted block is to be received in a bitstream of the video data and that a second motion vector for the bi-predicted block is to be received in the bitstream of the video data, and wherein a second value of the two values indicates that the first motion vector for the bi-predicted block is to be received in the bitstream of the video data and that the second motion vector for the bi-predicted block is determined without receiving explicit signaling in the bitstream of the video data;
   receiving a second syntax element identifying a motion vector predictor from a first candidate list of motion vector predictors;
   receiving a third syntax element identifying a motion vector difference;
   determining a first motion vector for the current block based on the motion vector predictor and the motion vector difference;
   in response to the first syntax having the second value, determining a second motion vector for the current block from a second list of candidate motion vector predictors based on bilateral matching; and
   determining a prediction block for the current block using the first motion vector for the current block and the second motion vector for the current block.

2. The method of claim 1, wherein determining the second motion vector for the current block from the second list of candidate motion vector predictors based on the bilateral matching comprises:
   locating a first reference block in a first reference picture using the first motion vector for the current block, wherein the first reference picture is from a first reference picture list;
   for each of a plurality of candidates in the second list of candidate motion vector predictors, locating a second reference block in a second reference picture using a respective motion vector of the respective candidate, wherein the second reference picture is from a second reference picture list; and
   determining a bilateral matching error between the first reference block and the second reference block.

3. The method of claim 1, wherein determining the second motion vector for the current block from the second list of candidate motion vector predictors based on the bilateral matching comprises:
   locating a first reference block in a first reference picture using the first motion vector for the current block;
   for each of a plurality of candidates in the second list of candidate motion vector predictors, determining a bilateral matching cost error between the first reference block and a second reference block located with a respective motion vector of each respective candidate;

identifying a candidate from the plurality of candidates that has a minimum bilateral matching error; and deriving the second motion vector for the current block from the motion vector of the candidate from the plurality of candidates that has the minimum bilateral matching error.

4. The method of claim 3, wherein deriving the second motion vector for the current block from the motion vector of the candidate from the plurality of candidates that has the minimum bilateral matching error comprises performing bilateral matching motion vector refinement.

5. The method of claim 4, wherein performing the bilateral matching motion vector refinement comprises:
identifying an initial second reference block using the motion vector of the candidate from the plurality of candidates that has the minimum bilateral matching error;
searching within a search range around the initial second reference block for a final second reference block that produces a lower bilateral matching error with respect to the first reference block than does the initial second reference block; and
determining the second motion vector for the current block based on the final second reference block.

6. The method of claim 1, further comprising:
determining whether bi-prediction is enabled for a slice containing the current block; and
receiving the first syntax element in response to determining that the bi-prediction is enabled for the slice containing the current block.

7. A device for decoding video data, the device comprising:
a memory configured to store the video data; and
one or more processors implemented in circuitry and configured to:
determine that a current block of the video data is coded in a bi-prediction inter mode;
receive a first syntax element, wherein the first syntax element comprises a flag with one of only two values, wherein a first value of the two values indicates that a first motion vector for a bi-predicted block is to be received in a bitstream of the video data and that a second motion vector for the bi-predicted block is to be received in the bitstream of the video data, and wherein a second value of the two values indicates that the first motion vector for the bi-predicted block is to be received in the bitstream of the video data and that the second motion vector for the bi-predicted block is determined without receiving explicit signaling in the bitstream of the video data;
receive a second syntax element identifying a motion vector predictor from a first candidate list of motion vector predictors;
receive a third syntax element identifying a motion vector difference;
determine a first motion vector for the current block based on the motion vector predictor and the motion vector difference;
in response to the first syntax having the second value, determine a second motion vector for the current block from a second list of candidate motion vector predictors based on bilateral matching; and
determine a prediction block for the current block using the first motion vector for the current block and the second motion vector for the current block.

8. The device of claim 7, wherein to determine the second motion vector for the current block from the second list of candidate motion vector predictors based on the bilateral matching, the one or more processors are further configured to:
locate a first reference block in a first reference picture using the first motion vector for the current block, wherein the first reference picture is from a first reference picture list;
for each of a plurality of candidates in the second list of candidate motion vector predictors, locate a second reference block in a second reference picture using a respective motion vector of the respective candidate, wherein the second reference picture is from a second reference picture list; and
determine a bilateral matching error between the first reference block and the second reference block.

9. The device of claim 7, wherein to determine the second motion vector for the current block from the second list of candidate motion vector predictors based on the bilateral matching, the one or more processors are further configured to:
locate a first reference block in a first reference picture using the first motion vector for the current block;
for each of a plurality of candidates in the second list of candidate motion vector predictors, determine a bilateral matching cost error between the first reference block and a second reference block located with a respective motion vector of each respective candidate;
identify a candidate from the plurality of candidates that has a minimum bilateral matching error; and
derive the second motion vector for the current block from the motion vector of the candidate from the plurality of candidates that has the minimum bilateral matching error.

10. The device of claim 9, wherein to derive the second motion vector for the current block from the motion vector of the candidate from the plurality of candidates that has the minimum bilateral matching error, the one or more processors are further configured to perform bilateral matching motion vector refinement.

11. The device of claim 10, wherein to perform the bilateral matching motion vector refinement, the one or more processors are further configured to:
identify an initial second reference block using the motion vector of the candidate from the plurality of candidates that has the minimum bilateral matching error;
search within a search range around the initial second reference block for a final second reference block that produces a lower bilateral matching error with respect to the first reference block than does the initial second reference block; and
determine the second motion vector for the current block based on the final second reference block.

12. The device of claim 7, wherein the one or more processors are further configured to:
determine whether bi-prediction is enabled for a slice containing the current block; and
receive the first syntax element in response to determining that the bi-prediction is enabled for the slice containing the current block.

13. The device of claim 7, wherein the device comprises a wireless communication device, further comprising a receiver configured to receive encoded video data.

14. The device of claim 13, wherein the wireless communication device comprises a telephone handset and wherein the receiver is configured to demodulate, according to a wireless communication standard, a signal comprising the encoded video data.

15. The device of claim 7, further comprising a display configured to display decoded video data.

16. The device of claim 7, wherein the device comprises one or more of a camera, a computer, a mobile device, a broadcast receiver device, or a set-top box.

17. A device for encoding video data, the device comprising:
- a memory configured to store the video data;
- one or more processors implemented in circuitry and configured to:
  - determine that a current block of the video data is coded in a bi-prediction inter mode;
  - determine a first motion vector for the current block;
  - generate, for inclusion in a bitstream of encoded video data, a first syntax element identifying a motion vector predictor from a first candidate list of motion vector predictors;
  - generate, for inclusion in the bitstream of encoded video data, a second syntax element identifying a motion vector difference, wherein the motion vector predictor and the motion vector difference correspond to the first motion vector;
  - determine a second motion vector for the current block from a second list of candidate motion vector predictors based on bilateral matching;
  - determine a prediction block for the current block using the first motion vector for the current block and the second motion vector for the current block; and
  - encode the current block of video data based on the prediction block;
  - generate, for inclusion in the bitstream of encoded video data, a third syntax element, wherein the third syntax element comprises a flag with one of only two values, wherein a first value of the two values indicates that the second motion vector for the current block is determined for the current block from the second list of candidate motion vector predictors based on the bilateral matching, and a second value of the two values indicates that the second motion vector for the current block is determined for the current block using explicit signaling; and
  - set the third syntax element to the first value.

18. The device of claim 17, wherein to encode the current block of video data based on the prediction block, the one or more processors are further configured to generate the bitstream of encoded video data without including in the bitstream of encoded video data explicit signaling identifying a candidate in the second list of candidate motion vector predictors.

19. The device of claim 17, wherein to determine the second motion vector for the current block from the second list of candidate motion vector predictors based on the bilateral matching, the one or more processors are further configured to:
- locate a first reference block in a first reference picture using the first motion vector, wherein the first reference picture is from a first reference picture list;
- for each of a plurality of candidates in the second list of candidate motion vector predictors, locate a second reference block in a second reference picture using a respective motion vector of the respective candidate, wherein the second reference picture is from a second reference picture list; and
- determine a bilateral matching error between the first reference block and the second reference block.

20. The device of claim 17, wherein to determine the second motion vector for the current block from the second list of candidate motion vector predictors based on the bilateral matching, the one or more processors are further configured to:
- locate a first reference block in a first reference picture using the first motion vector;
- for each of a plurality of candidates in the second list of candidate motion vector predictors, determine a bilateral matching cost error between the first reference block and a second reference block located with a respective motion vector of each respective candidate;
- identify a candidate from the plurality of candidates that has a minimum bilateral matching error; and
- derive the second motion vector for the current block from the motion vector of the candidate from the plurality of candidates that has the minimum bilateral matching error.

21. The device of claim 20, wherein to derive the second motion vector for the current block from the motion vector of the candidate from the plurality of candidates that has the minimum bilateral matching error, the one or more processors are further configured to perform bilateral matching motion vector refinement.

22. The device of claim 21, wherein to perform the bilateral matching motion vector refinement, the one or more processors are further configured to:
- identify an initial second reference block using the motion vector of the candidate from the plurality of candidates that has the minimum bilateral matching error;
- search within a search range around the initial second reference block for a final second reference block that produces a lower bilateral matching error with respect to the first reference block than does the initial second reference block; and
- determine the second motion vector for the current block based on the final second reference block.

23. The device of claim 17, wherein the one or more processors are further configured to determine, based on a coding mode of the current block, whether the second motion vector for the current block is determined for the current block from the second list of candidate motion vector predictors based on the bilateral matching or the second motion vector for the current block is determined for the current block using explicit signaling.

24. The device of claim 17, wherein the one or more processors are further configured to:
- determine whether bi-prediction is enabled for a slice containing the current block; and
- generate, for inclusion in the bitstream of encoded video data, the third syntax element in response to determining that the bi-prediction is enabled for the slice containing the current block.

25. The device of claim 17, wherein the device comprises a wireless communication device, further comprising a transmitter configured to transmit encoded video data.

26. The device of claim 25, wherein the wireless communication device comprises a telephone handset and wherein the transmitter is configured to modulate, according to a wireless communication standard, a signal comprising the encoded video data.

27. The device of claim 17, further comprising a camera configured to capture video data.

28. The device of claim 17, wherein the device comprises one or more of a camera, a computer, a mobile device, a broadcast receiver device, or a set-top box.

29. A computer-readable storage medium storing instructions that when executed by one or more processors cause the one or more processors to:
- determine that a current block of video data is coded in a bi-prediction inter mode;
- receive a first syntax element, wherein the first syntax element comprises a flag with one of only two values, wherein a first value of the two values indicates that a first motion vector for a bi-predicted block is to be received in a bitstream of the video data and that a second motion vector for the bi-predicted block is to be received in the bitstream of the video data, and wherein a second value of the two values indicates that the first motion vector for the bi-predicted block is to be received in the bitstream of the video data and that the second motion vector for the bi-predicted block is determined without receiving explicit signaling in the bitstream of the video data;
- receive a second syntax element identifying a motion vector predictor from a first candidate list of motion vector predictors;
- receive a third syntax element identifying a motion vector difference;
- determine a first motion vector for the current block based on the motion vector predictor and the motion vector difference;
- in response to the first syntax having the second value, determine a second motion vector for the current block from a second list of candidate motion vector predictors based on bilateral matching; and
- determine a prediction block for the current block using the first motion vector for the current block and the second motion vector for the current block.

30. The computer-readable storage medium of claim 29, wherein to determine the second motion vector for the current block from the second list of candidate motion vector predictors based on the bilateral matching, the instructions cause the one or more processors to:
- locate a first reference block in a first reference picture using the first motion vector for the current block, wherein the first reference picture is from a first reference picture list;
- for each of a plurality of candidates in the second list of candidate motion vector predictors, locate a second reference block in a second reference picture using a respective motion vector of the respective candidate, wherein the second reference picture is from a second reference picture list; and
- determine a bilateral matching error between the first reference block and the second reference block.

31. The computer-readable storage medium of claim 29, wherein to determine the second motion vector for the current block from the second list of candidate motion vector predictors based on the bilateral matching, the instructions cause the one or more processors to:
- locate a first reference block in a first reference picture using the first motion vector for the current block;
- for each of a plurality of candidates in the second list of candidate motion vector predictors, determine a bilateral matching cost error between the first reference block and a second reference block located with a respective motion vector of each respective candidate;
- identify a candidate from the plurality of candidates that has a minimum bilateral matching error; and
- derive the second motion vector for the current block from the motion vector of the candidate from the plurality of candidates that has the minimum bilateral matching error.

32. The computer-readable storage medium of claim 31, wherein to derive the second motion vector for the current block from the motion vector of the candidate from the plurality of candidates that has the minimum bilateral matching error, the instructions cause the one or more processors to perform bilateral matching motion vector refinement.

33. The computer-readable storage medium of claim 32, wherein to perform the bilateral matching motion vector refinement, the instructions cause the one or more processors to:
- identify an initial second reference block using the motion vector of the candidate from the plurality of candidates that has the minimum bilateral matching error;
- search within a search range around the initial second reference block for a final second reference block that produces a lower bilateral matching error with respect to the first reference block than does the initial second reference block; and
- determine the second motion vector for the current block based on the final second reference block.

34. The computer-readable storage medium of claim 29, storing further instructions that when executed cause the one or more processors to:
- determine whether bi-prediction is enabled for a slice containing the current block; and
- receive the third syntax element in response to determining that the bi-prediction is enabled for the slice containing the current block.

* * * * *